United States Patent
Kim et al.

(10) Patent No.: US 10,476,681 B2
(45) Date of Patent: Nov. 12, 2019

(54) SEMICONDUCTOR DEVICE GENERATING SECURITY KEY, METHOD OF GENERATING SECURITY KEY, AND METHOD OF ENROLLING SECURITY KEY

(71) Applicant: SAMSUNG ELECTRONICS CO., LTD., Suwon-si, Gyeonggi-Do (KR)

(72) Inventors: Yongsoo Kim, Osan-si (KR); Mijung Noh, Yongin-si (KR); Bohdan Karpinskyy, Suwon-si (KR); Kyoungmoon Ahn, Seoul (KR); Yong Ki Lee, Yongin-si (KR); Yunhyeok Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/140,019

(22) Filed: Sep. 24, 2018

(65) Prior Publication Data
US 2019/0116052 A1   Apr. 18, 2019

(30) Foreign Application Priority Data

Oct. 13, 2017   (KR) .................. 10-2017-0133540
May 21, 2018   (KR) .................. 10-2018-0057964

(51) Int. Cl.
*H04L 9/32*     (2006.01)
*G06F 7/58*     (2006.01)
(Continued)

(52) U.S. Cl.
CPC ............ *H04L 9/3278* (2013.01); *G06F 7/588* (2013.01); *H04L 9/0816* (2013.01); *H04L 9/304* (2013.01)

(58) Field of Classification Search
CPC ... H04L 9/3278; H04L 9/0816; H04L 9/0861; G06F 12/14; G06F 12/1408; G06F 12/1416
See application file for complete search history.

(56) References Cited

U.S. PATENT DOCUMENTS 8,719,666 B2 * 5/2014 Marinet .................. G06F 21/73
                                                              714/769
9,252,960 B2   2/2016 Schrijen et al.
(Continued)

FOREIGN PATENT DOCUMENTS

KR   1020160065297 A   6/2016
KR   1020160109891 A   9/2016
(Continued)

*Primary Examiner* — Jason Crawford
(74) *Attorney, Agent, or Firm* — Volentine, Whitt & Francos, PLLC

(57) ABSTRACT

A semiconductor device includes a physical unclonable function (PUF) cell array that includes PUF cells outputting first bits; a non-volatile memory that stores marking bits indicating whether the first bits are valid, first mask bits generated by masking second bits depending on parity of the second bits, and second mask bits generated by masking helper bits of the second bits, the second bits are valid bits from the first bits; an extracting unit that extracts the second bits from the first bits using the marking bits; an unmasking unit that unmasks the second bits using the first mask bits while receiving the second bits to provide the third bits; a bit decoding unit that compresses the third bits to fourth bits while receiving the third bits; and a block decoding unit that generates a security key by decoding the fourth bits and the second mask bits.

20 Claims, 13 Drawing Sheets

(51) Int. Cl.
  *H04L 9/30* (2006.01)
  *H04L 9/08* (2006.01)

(56) References Cited

U.S. PATENT DOCUMENTS

| | | |
|---|---|---|
| 9,337,837 B2 | 5/2016 | Pfeiffer et al. |
| 9,489,999 B2 | 11/2016 | Rosenberg et al. |
| 9,548,113 B2 | 1/2017 | Yoshimoto et al. |
| 9,584,329 B1 | 2/2017 | Trimberger |
| 2013/0051552 A1 | 2/2013 | Handschuh et al. |
| 2015/0195085 A1* | 7/2015 | Kim ................. H04L 9/002 380/28 |
| 2016/0156476 A1* | 6/2016 | Lee ................. H04L 9/0866 380/44 |
| 2016/0373264 A1 | 12/2016 | Katoh |
| 2018/0006813 A1 | 1/2018 | Van Der Leest et al. |
| 2018/0323968 A1* | 11/2018 | Lee ................. H04L 9/0866 |
| 2018/0337793 A1* | 11/2018 | Park ................. H04L 9/3278 |

FOREIGN PATENT DOCUMENTS

| | | |
|---|---|---|
| KR | 101678568 B1 | 11/2016 |
| KR | 101727130 B1 | 4/2017 |
| KR | 1020170100602 A | 9/2017 |

\* cited by examiner

FIG. 9
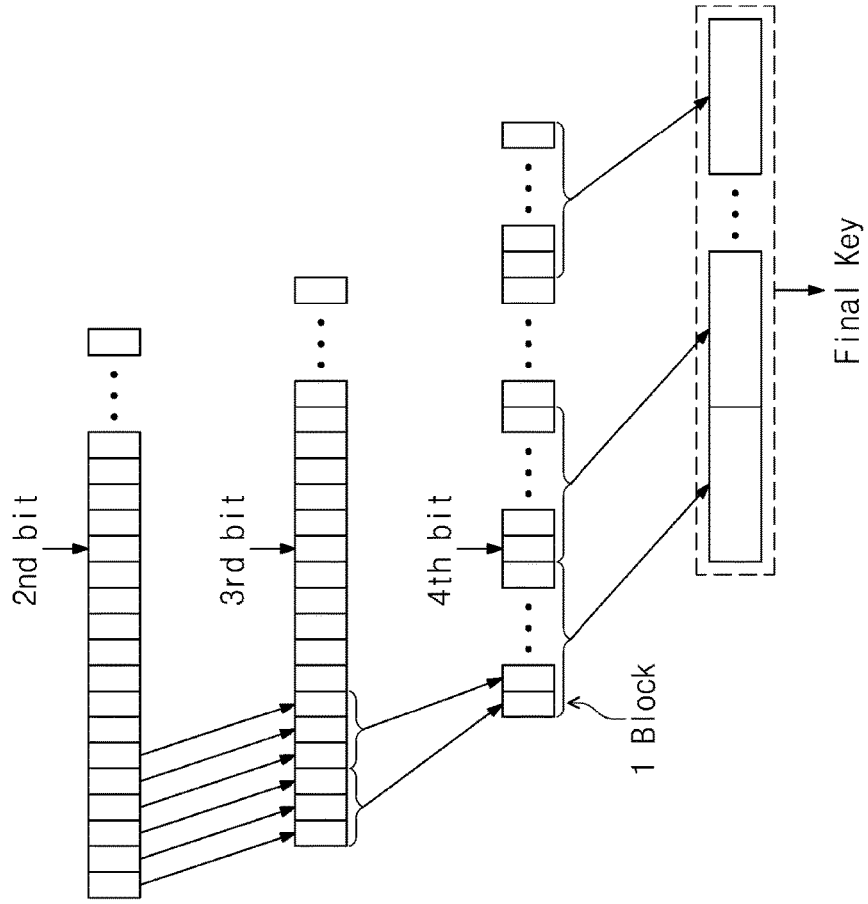
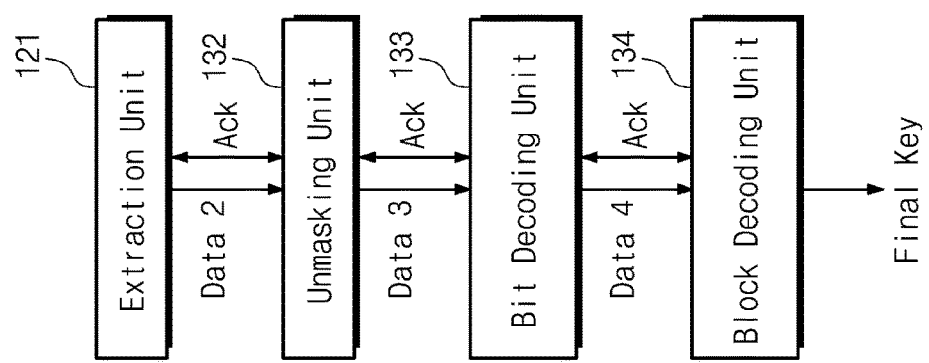

US 10,476,681 B2

SEMICONDUCTOR DEVICE GENERATING SECURITY KEY, METHOD OF GENERATING SECURITY KEY, AND METHOD OF ENROLLING SECURITY KEY

CROSS-REFERENCE TO RELATED APPLICATIONS

A claim of priority under 35 U.S.C. § 119 is made to Korean Patent Application No. 10-2017-0133540 filed on Oct. 13, 2017, and Korean Patent Application No. 10-2018-0057964 filed on May 21, 2018, in the Korean Intellectual Property Office, the entire contents of which are hereby incorporated by reference.

BACKGROUND

The present inventive concepts relate to semiconductor devices that generate a security key, a method of generating the security key, and a method of enrolling the security key.

Technologies related to security and encryption have become increasingly important with regard to communication and mobile devices. Since keys generated by software schemes may be leaked or stolen through hacking, hardware-based security schemes are currently being developed. In particular, semiconductor devices having a physically unclonable function (PUF) are being developed.

Semiconductor devices having a PUF may generate a unique key randomly based on a process variation. The key as generated by such semiconductor devices may be prevented from being cloned because the process variation is used. However, the data output by such semiconductor devices may include error due to the process variation. An error correction operation may be used to reduce a bit error rate (BER) of the output data. As security and encryption have become increasingly important, the size or amount of data output by semiconductor devices has currently been increasing, and thus the time necessary to perform error correction operations has increased. Accordingly there is a need to reduce the area and operating time of the semiconductor device.

SUMMARY

Embodiments of the inventive concepts provide a semiconductor device generating a security key, a method of generating the security key, and a method of enrolling the security key.

Embodiments of the inventive concepts provide a semiconductor device that includes a physically unclonable function (PUF) cell array that includes PUF cells outputting first bits; a non-volatile memory that stores marking bits indicative of whether the first bits are valid, first mask bits generated by masking second bits depending on a parity of the second bits, and second mask bits generated by masking helper bits associated with the second bits, the second bits are valid bits from among the first bits; an extracting unit that extracts the second bits from the first bits by using the marking bits; an unmasking unit that unmasks the second bits by using the first mask bits while receiving the second bits to provide third bits; a bit decoding unit that compresses the third bits to provide fourth bits while receiving the third bits; and a block decoding unit that generates a security key by decoding the fourth bits and the second mask bits. The extracting unit, the unmasking unit, the bit decoding unit, and the block decoding unit may be connected in series and may operate concurrently.

Embodiments of the inventive concepts also provide a security key generation method of a semiconductor device which includes a physically unclonable function (PUF) cell array, an extraction unit, an unmasking unit, a bit decoding unit, and a block decoding unit connected in series. The security key generation method includes extracting, by the extraction unit, second bits from among first bits while receiving the first bits from the PUF cell array and receiving marking bits indicative of whether the first bits are valid from a non-volatile memory, the second bits are valid bits from among the first bits; unmasking, by the unmasking unit, the second bits to provide unmasked third bits by using first mask bits while receiving the second bits from the extraction unit and receiving the first mask bits from the non-volatile memory; compressing, by the bit decoding unit, the unmasked third bits to provide fourth bits while receiving the unmasked third bits from the unmasking unit; and generating, by the block decoding unit, a security key by decoding the fourth bits and second mask bits while receiving the fourth bits from the bit decoding unit and the second mask bits from the non-volatile memory.

Embodiments of the inventive concepts further provide a security key enrollment method of a semiconductor device which includes a physically unclonable function (PUF) cell array, an extraction unit, a bit encoding unit, and a block encoding unit connected in series. The security key enrollment method includes transmitting, by the extraction unit, marking bits indicative of second bits from among first bits to a non-volatile memory while receiving the first bits from the PUF cell array, the second bits are valid bits from among the first bits; generating, by the bit encoding unit, first mask bits by encoding the second bits depending on a parity of the second bits while receiving the second bits from the extraction unit, and transmitting the first mask bits to the non-volatile memory; generating, by the bit encoding unit, third bits by compressing the second bits; and generating, by the block encoding unit, helper bits by encoding the third bits, generating second mask bits by masking the helper bits by using the third bits, and transmitting the second mask bits to the non-volatile memory, while receiving the third bits from the bit encoding unit.

Embodiments of the inventive concepts still further provide an electronic system including a host; and a storage device including a physically unclonable function (PUF) device. The PUF device including a PUF cell array including PUF cells outputting first bits, and a key generation unit configured to extract second bits from among the first bits while receiving marking bits from a non-volatile memory and that are indicative of whether the first bits are valid, wherein the second bits are valid bits from among the first bits, unmask the second bits to provide unmasked third bits by using first mask bits received from the non-volatile memory, compress the unmasked third bits to provide fourth bits, and generate a security key by decoding the fourth bits and second mask bits received from the non-volatile memory. The host is configured to perform an authentication procedure for accessing the storage device based on the security key.

BRIEF DESCRIPTION OF THE FIGURES

The above and other objects and features of the inventive concepts will become apparent in view of the following detailed description of exemplary embodiments with reference to the accompanying drawings.

FIG. 9 illustrates a diagram of how data are processed in a key generation unit of FIG. 1.

DETAILED DESCRIPTION

Embodiments of the inventive concepts are hereinafter described in detail and clearly to such an extent that one of ordinary skill in the art may easily implement the inventive concepts.

As is traditional in the field of the inventive concepts, embodiments may be described and illustrated in terms of units which carry out a described function or functions. These units, which may be referred to herein as blocks or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a unit may be implemented by dedicated hardware, or by a processor (e.g., one or more programmed microprocessors and associated circuitry), or by a combination of dedicated hardware to perform some functions of the unit and a processor to perform other functions of the unit. Each unit of the embodiments may be physically separated into two or more interacting and discrete units without departing from the scope of the inventive concepts. Likewise, the units of the embodiments may be physically combined into more complex units without departing from the scope of the inventive concepts.

Figure 1:
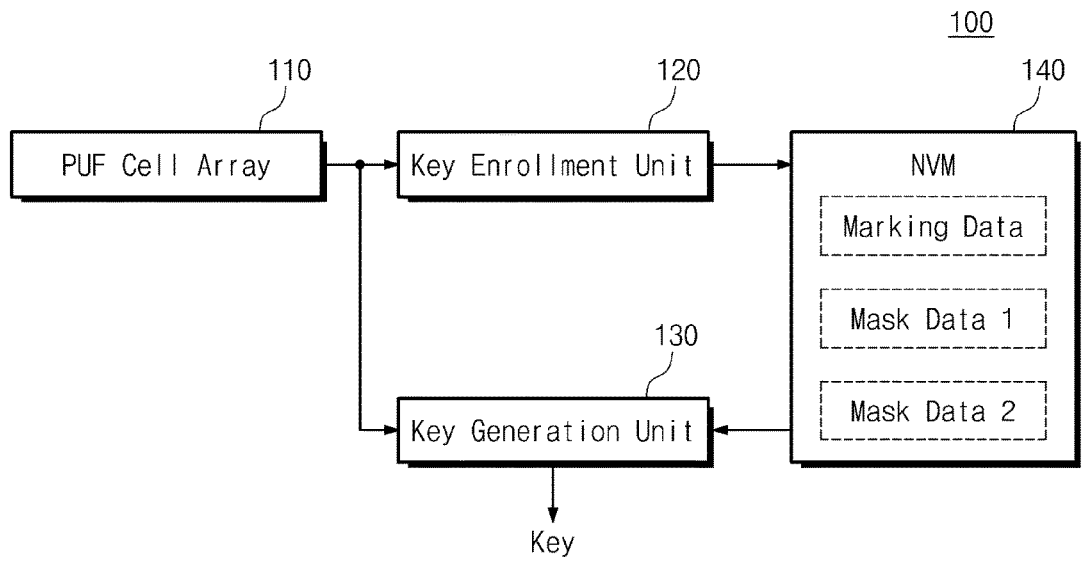
FIG. 1 illustrates a block diagram of a semiconductor device according to embodiments of the inventive concepts.

FIG. 1 illustrates a block diagram of a semiconductor device according to embodiments of the inventive concepts. Semiconductor device 100 includes a physically unclonable function (PUF) cell array 110, a key enrollment unit 120, a key generation unit 130, and a non-volatile memory (hereinafter referred to as an NVM) 140.

The PUF cell array 110 includes PUF cells. The PUF cell array 110 generates a unique electronic signature according to a process variation which occurs during manufacture of the PUF cell array 110. Due to process variations, data output from PUF cell arrays of a plurality of semiconductor devices may be different from each other. That is, each of the semiconductor devices may generate a unique security key by using the PUF cell array 110.

For example, the PUF cell array 110 may include at least one of a PUF cell based on a threshold voltage of a transistor, an arbiter-based PUF cell (e.g., a feed-forward PUF cell, an XOR PUF cell in which arbiter PUF cells are arranged in parallel, or a lightweight PUF cell), a ring oscillator-based PUF cell, a memory-based PUF cell (e.g., a static random access memory (SRAM) PUF cell, a latch PUF cell, a flash memory PUF cell, or a memistor PUF cell), and a PUF cell reconfigurable according to a laser beam or a thermal variation, among other types of PUF cells.

A bit error rate (BER) of PUF data output from the PUF cell array 110 may be high due to the process variation. However, the integrity of a key should be guaranteed when using the PUF data as a key of encryption and decryption or a key such as an authentication code. The semiconductor device 100 therefore includes a circuit, a module, or a unit for improving the BER of the PUF data.

The key enrollment unit 120 generates data for improving or reducing the BER of the PUF data. The key enrollment unit 120 stores data, which are used to correct an error of the PUF data, to the NVM 140 through a key enrollment process.

The key enrollment unit 120 receives the PUF data from the PUF cell array 110 and generates marking data. The marking data may include marking bits indicating valid bits output from valid PUF cells of all PUF cells in the PUF cell array 110. The valid PUF cells of the PUF cell array 110 may be selected through various test processes of a mass production level. The selected valid PUF cells may be used to enroll and generate a key, and unselected PUF cells may not be used to enroll and generate a key. The key enrollment unit 120 transmits the marking data to the NVM 140.

In an embodiment, the number of marking bits of the marking data may be identical to the number of PUF bits configuring the PUF data. A valid map may be created by using the marking bits of the marking data indicating whether the respective PUF cells of the PUF cell array 110 are valid. For example, a marking bit having a logical value of "1" may indicate a valid PUF bit, and a marking bit having a logical value of "0" may indicate an invalid PUF bit. In contrast and as another example, a marking bit having a logical value of "0" may indicate a valid PUF bit, and a marking bit having a logical value of "1" may indicate an invalid PUF bit. That is, the valid map composed of marking bits, the number of which is identical to the number of all the PUF cells of the PUF cell array 110, may be stored in the NVM 140.

The key enrollment unit 120 may generate data for correcting an error of the PUF data. The key enrollment unit 120 may encode the PUF data of valid PUF cells. The key enrollment unit 120 may transmit an encoding result to the NVM 140. The encoding result may be generated based on the PUF data. In the case where the encoding result is stored in the NVM 140 without modification, an attacker may infer or predict the PUF data by using the encoding result stored in the NVM 140. Accordingly, the encoding result may be masked, and the masked encoding result may be transmitted to the NVM 140.

Referring to FIG. 1, the masked encoding result may include first mask data and second mask data. For example, the first mask data are data of which helper data used to correct a bit error of the PUF data are masked, and the second mask data are data of which helper data used to correct a block error of the PUF data are masked. The error of the PUF data may be corrected in units of a bit or in units of a block. A 1-bit error may be corrected through bit error correction, and an error of a plurality of bits included in a block may be corrected through block error correction. The size or length of the plurality of bits included in the block may be determined depending on an error correction code.

In an embodiment, the key enrollment unit 120 may be used to store the marking data and the masked encoding result to the NVM 140. Key enrollment may be performed only once by the key enrollment unit 120 in a mass production process (or a test process). That is, the key enrollment unit 120 may be used in the mass production process for storing the marking data, the first mask data, and the second mask data to the NVM 140.

The key generation unit 130 reads the marking data, the first mask data, and the second mask data stored in the NVM 140 after the key enrollment process. The key generation unit 130 decodes the PUF data by using the marking data, the first mask data, and the second mask data, corrects an error which may be included in the PUF data, and generates a security key (i.e., Key). Due to the process variation, the PUF data of the key generation process may be different from the PUF data of the key enrollment process. Nevertheless, the key generation unit 130 may recover a key through bit error correction and block error correction.

The length of the security key may be determined depending on various applications which the semiconductor device 100 uses, such as a security algorithm and an encryption algorithm, and the PUF cell array 110 may output the PUF data as having a size larger than the length of the security key. According to an embodiment of the inventive concepts, the key enrollment unit 120 and the key generation unit 130 may not process PUF bits after all PUF bits needed to enroll and generate a key are output from the PUF cell array 110. The key enrollment unit 120 and the key generation unit 130 may process received PUF bits while receiving the PUF bits from the PUF cell array 110.

The NVM 140 stores the marking data, the first mask data, and second mask data. Referring to FIG. 1, the NVM 140 may be illustrated as being included in the semiconductor device 100 or as being implemented within the semiconductor device 100. However, the inventive concepts are not limited thereto. For example, in some embodiments of the inventive concepts the NVM 140 may be a storage device which is positioned outside the semiconductor device 100.

In an embodiment of the inventive concepts the NVM 140 may include for example at least one of NAND flash memory, NOR flash memory, resistive random access memory (RRAM), ferroelectric random access memory (FRAM), phase change random access memory (PRAM), thyristor random access memory (TRAM), magnetic random access memory (MRAM), and one-time programmable (OTP) memory, or the like.

Figure 2:
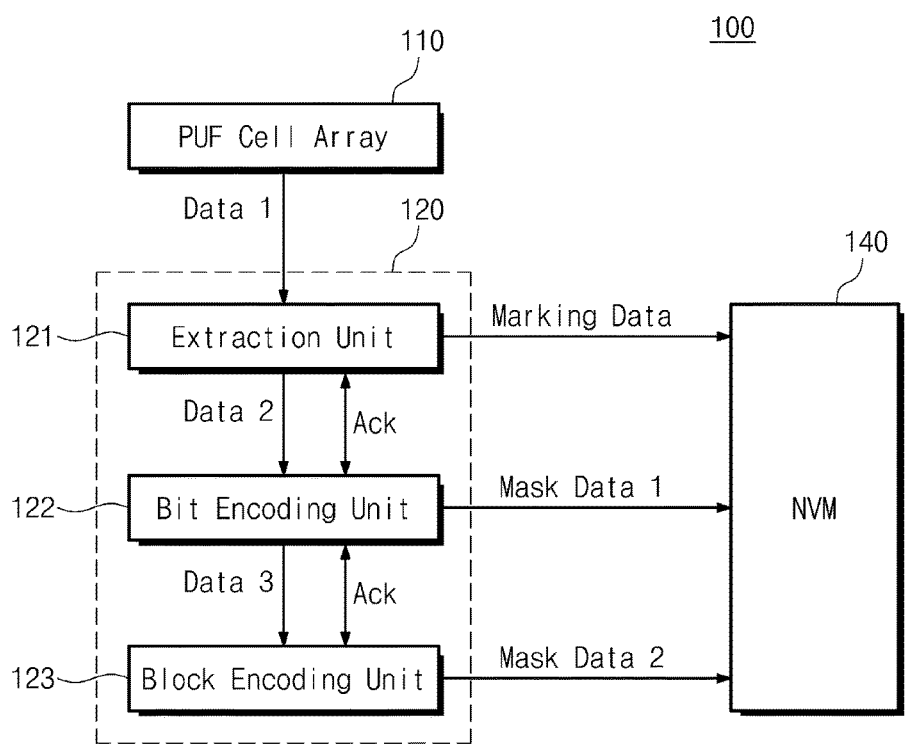
FIG. 2 illustrates a block diagram of a key enrollment unit of FIG. 1 in detail.

FIG. 2 illustrates a block diagram of a key enrollment unit of FIG. 1 in detail. FIG. 2 will be described with reference to FIG. 1. For purposes of simplification, illustration of the key generation unit 130 of FIG. 1 is omitted from FIG. 2.

The PUF cell array 110 transmits first data (Data 1) composed of first bits to the key enrollment unit 120. For example, the PUF cell array 110 may include PUF cells, the number of which is a multiple of 2, such as 4096. According to an embodiment of the inventive concepts, the PUF cell array 110 may not transmit the first bits output from all the PUF cells to the key enrollment unit 120 simultaneously. Instead, the PUF cell array 110 may sequentially transmit the first bits to the key enrollment unit 120, whereby the first bits may include a number of bits corresponding to a number of PUF cells configuring a sub PUF cell array. For example, the sub PUF cell array may be a PUF cell set which is composed of a part of the PUF cells of the PUF cell array 110. For example, the PUF cell array 110 may transmit all the first bits to the key enrollment unit 120 by sequentially transmitting first bits to the key enrollment unit 120 in units of the size of a sub PUF cell array, such as 16 bits or 32 bits.

The key enrollment unit 120 includes an extraction unit 121, a bit encoding unit 122, and a block encoding unit 123. Referring to FIG. 2, the extraction unit 121, the bit encoding unit 122, and the block encoding unit 123 may be connected in series to enable a pipeline operation. The key enrollment unit 120 may not wait until all the first bits configuring the first data are received from the PUF cell array 110. For example, while receiving first bits from the PUF cell array 110 corresponding in number to the number of PUF cells of the sub PUF cell array (or in units of a sub PUF cell array), the key enrollment unit 120 may process the received first bits corresponding in number to the number of PUF cells of the sub PUF cell array.

The extraction unit 121 receives the first bits configuring the first data from the PUF cell array 110. The extraction unit 121 generates marking bits indicating second bits, which are valid, from among the first bits while receiving the first bits. The extraction unit 121 transmits the marking bits (Marking Data) to the NVM 140. The extraction unit 121 transmits second data (Data 2) composed of the second bits to the bit encoding unit 122. Here, as described above, the second bits may be bits, which are valid, from among the received first bits.

The bit encoding unit 122 encodes the second bits in units of bit encoding while receiving the second bits configuring the second data from the extraction unit 121. For example, the bit encoding unit 122 may generate first mask bits by encoding the second bits depending on parity of the second bits, the size of which corresponds to the unit of bit encoding. The first mask bits may configure the first mask data, and the first mask data may be used to correct an error of the second bits, which may occur in the key generation process, in units of a bit. The bit encoding unit 122 transmits the first mask bits (Mask Data 1) to the NVM 140.

Also, the bit encoding unit 122 transmits third bits (Data 3) of which the second bits are compressed, to the block encoding unit 123. Each of the third bits may correspond to a bit of which the second bits corresponding to the unit of bit encoding are compressed. The third bits may configure third data.

The block encoding unit 123 encodes the third bits in units of block encoding while receiving the third bits configuring the third data from the bit encoding unit 122. For example, the block encoding unit 123 may generate second mask bits by encoding the third bits, the size of which corresponds to the unit of block encoding, to an error correction code (ECC). The second mask bits may configure the second mask data, and the second mask data may be used to correct an error of the second bits, which may occur in the key generation process, in units of a block. The block encoding unit 123 transmits the second mask bits (Mask Data 2) to the NVM 140.

In an embodiment of the inventive concepts, the error correction code may be at least one of coded modulations such as a low density parity check (LDPC) code, a Bose-Chaudhuri-Hocquenghem (BCH) code, a turbo code, a Reed-Solomon code, a convolution code, a recursive systematic code (RSC), trellis-coded modulation (TCM), and block coded modulation (BCM).

As described above, the PUF cell array 110, the extraction unit 121, the bit encoding unit 122, and the block encoding unit 123 may be connected in series. The extraction unit 121 may transmit the second bits, which are valid, from among the first bits output from the PUF cell array 110, to the bit encoding unit 122. The bit encoding unit 122 may gather and encode the second bits in units of bit encoding. The bit encoding unit 122 may transmit the third bits to the block encoding unit 123. The block encoding unit 123 may gather and encode the third bits in units of block encoding.

In an embodiment of the inventive concepts, the extraction unit 121, the bit encoding unit 122, and the block encoding unit 123 may operate based on a clock. The second bits and the third bits may be transmitted in synchronization with the clock. For example, the extraction unit 121 and the bit encoding unit 122 may exchange acknowledgment signals Ack with each other for transmitting and receiving the second bits based on the clock. The bit encoding unit 122 and the block encoding unit 123 may exchange acknowledgment signals Ack with each other for transmitting and receiving the third bits based on the clock.

The unit of bit encoding may be determined depending on a bit error correction code or a bit error correction operation and may be referred to as a "unit of encoding for the bit error correction code". For example, the bit error correction code may be a repetition code associated with a majority voting operation. As in the above description, the unit of block encoding may be determined depending on a block error correction code or a block error correction operation and may be referred to as a "unit of encoding for the block error correction code". For example, the block error correction code may be a BCH code.

Bits may be sequentially transmitted toward the extraction unit 121, the bit encoding unit 122, and the block encoding unit 123, and each of the extraction unit 121, the bit encoding unit 122, and the block encoding unit 123 may process a received bit while receiving a bit. That is, the extraction unit 121, the bit encoding unit 122, and the block encoding unit 123 may simultaneously operate. While the PUF cell array 110 outputs the first bits, the extraction unit 121 may process the first bits first output from the PUF cell array 110. While the extraction unit 121 outputs the second bits, the bit encoding unit 122 may process the second bits first output from the extraction unit 121. While the bit encoding unit 122 outputs the third bits, the block encoding unit 123 may process the third bits first output from the bit encoding unit 122. Accordingly, while the PUF data (i.e., the first data composed of the first bits) are output from the PUF cell array 110, since the marking data, the first mask data, and the second mask data to be stored to the NVM 140 are generated, a time taken to enroll a key may decrease.

Figure 3:
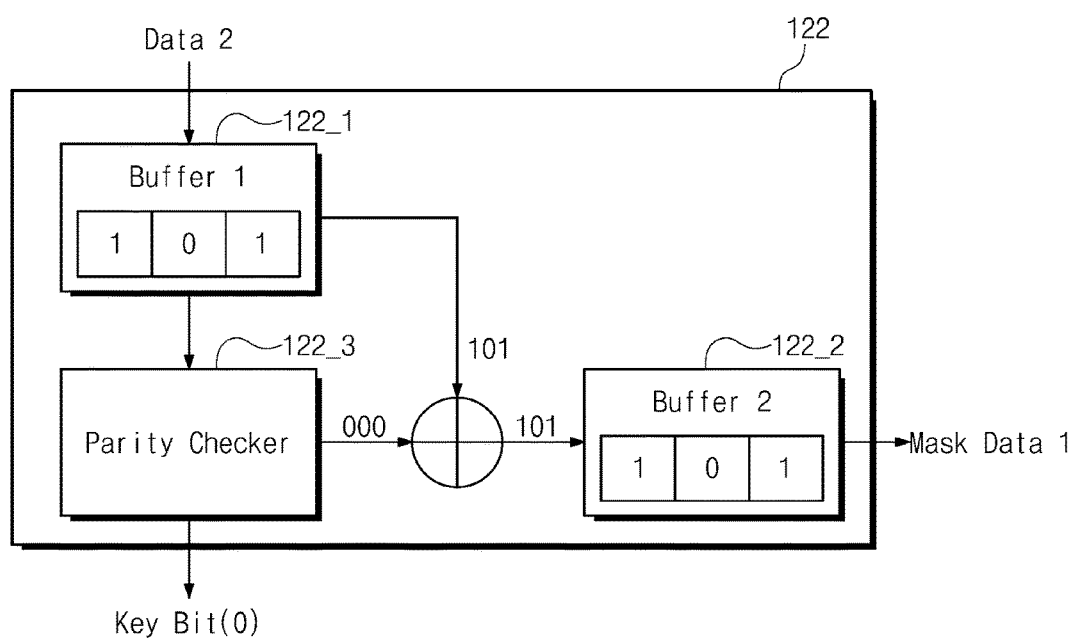
FIG. 3 illustrates a block diagram of a bit encoding unit of FIG. 2 in detail.

FIG. 3 illustrates a block diagram of a bit encoding unit of FIG. 2 in detail. FIG. 3 will be described with reference to FIG. 2. The bit encoding unit 122 includes a first buffer (Buffer 1) 122_1, a second buffer (Buffer 2) 122_2, and a parity checker 122_3.

The first buffer 122_1 receives and stores the second bits of the second data from the extraction unit 121. The second bits stored in the first buffer 122_1 may be updated by the extraction unit 121. The number of second bits stored in the first buffer 122_1 may be determined depending on a unit of bit encoding. For example, in the case where the bit encoding unit 122 encodes the second bits depending on a repetition code, the number of bits to be stored in the first buffer 122_1 may be an odd number of at least 3 or more. An example is illustrated in FIG. 3 as three bits are stored in the first buffer 122_1. However, the inventive concepts are not limited thereto, and according to some embodiments of the inventive concepts, the first buffer 122_1 may store second bits in units of bit encoding, instead of storing all the second bits configuring the second data.

The second buffer 122_2 stores first mask bits of the first mask data which are a result of a bitwise operation of the bit encoding unit 122. The number of bits to be stored in the second buffer 122_2 may also be determined depending on the unit of bit encoding, and may be identical to the number of bits to be stored in the first buffer 122_1. The second buffer 122_2 may store the first mask bits in units of bit encoding, instead of storing all the first mask bits configuring the first mask data.

The parity checker 122_3 checks parity of the second bits stored in the first buffer 122_1, that is, the number of 1's. For example, the parity checker 122_3 may output a "0" key bit when the number of 1's is even and may output a "1" key bit when the number of 1's is odd. Here, the key bit may be a third bit (i.e., Data 3), and is generated by compressing the second bits stored in the first buffer 122_1 by the parity check.

The bit encoding unit 122 performs the bitwise operation on the second bits stored in the first buffer 122_1 and generates the first mask bits. An example is illustrated in FIG. 3 as the second bits of "101" are stored in the first buffer 122_1. For example, the bit encoding unit 122 may perform an exclusive OR (XOR) operation on "101" and "000" and may generate the first mask bits. The bit encoding unit 122 may perform various bitwise operations, such as an XNOR operation, in addition to the XOR operation. Here, bits of "000" and bits of "111" output from the parity checker 122_3 may be based on a checking result of the parity checker 122_3. For example, when the number of 1's of the second bits stored in the first buffer 122_1 is even, bits "000" are output from the parity checker 122_3 for the bitwise operation. For example, when the number of 1's of the second bits stored in the first buffer 122_1 is odd, bits "111" are output from the parity checker 122_3 for the bitwise operation.

The following Table 1 shows an operation result of the bit encoding unit 122 according to values of the second bits stored in the first buffer 122_1.

TABLE 1

| Data 2 | Number of '1' Bits | Key Bit | Bitwise Operation | Mask Data 1 |
|--------|--------------------|---------| ------------------|-------------|
| 000 | Even | 0 | 000 | 00 |
| 001 | Odd | 1 | 110 | 10 |
| 010 | Odd | 1 | 101 | 01 |
| 011 | Even | 0 | 011 | 11 |
| 100 | Odd | 1 | 011 | 11 |
| 101 | Even | 0 | 101 | 01 |
| 110 | Even | 0 | 110 | 10 |
| 111 | Odd | 1 | 000 | 00 |

In Table 1, when the number of 1's is even, a result of the bitwise operation of the bit encoding unit 122 may be identical to a value stored in the first buffer 122_1. When the number of 1's is odd, a result of the bitwise operation of the bit encoding unit 122 may be an inverted version of a value stored in the first buffer 122_1. A description is given with reference to FIG. 3 and Table 1 as the bit encoding unit 122 performs encoding based on even parity. However, in other embodiments of the inventive concepts the bit encoding unit 122 may perform encoding based on odd parity.

A result of the bitwise operation may be a value generated based on the second bits by the bit encoding unit 122. In the case where the result of the bitwise operation is stored to the NVM 140 without modification, an attacker may infer or predict the PUF data by using the result of the bitwise operation stored in the NVM 140. To prevent inferring or predicting of the PUF data, the result of the bitwise operation may be masked.

In Table 1, two values of second bits, which are in the inverse relation with respect to each other, have the same result as the bitwise operation. That is, in the case where second bits are "000" or "111" (that is in inverse relation with respect to each other), results of the bitwise operations may be identical, that is, "000". In the case where second bits are "001" or "110", results of the bitwise operations may be identical, that is, "110". In the case where second bits are "010" or "101", results of the bitwise operations may be identical, that is, "101". In the case where second bits are "011" or "100", results of the bitwise operations may be identical, that is, "011". Accordingly, even though one bit may be removed from the result of the bitwise operation, the removed bit may be recovered depending on one of even parity and odd parity which the bit encoding unit 122 depends on.

That is, the result of the bitwise operation may be masked by removing one bit from the result of the bitwise operation. Any one of bits corresponding to the result of the bitwise operation may be removed. Referring to Table 1, for example, the first mask bits may be generated by removing a most significant bit (MSB) from the result of the bitwise operation. In other embodiments, unlike Table 1, for example, a least significant bit (LSB) or an intermediate bit may be removed from the result of the bitwise operation. The bit encoding unit 122 transmits the remaining bits (i.e., the first mask bits) of the bits stored in the second buffer 122_2 other than the removed bit, to the NVM 140.

In an embodiment of the inventive concepts, the bit encoding unit 122 may further include a buffer for storing an intermediate value, a final value, etc. generated by encoding second bits stored in the first buffer 122_1, checking parity of the second bits, or performing a bitwise operation on the second bits, in addition to the first and second buffers 122_1 and 122_2 illustrated in FIG. 3. Also, an embodiment is illustrated in FIG. 3 as the bit encoding unit 122 includes one first buffer 122_1 and one second buffer 122_2. However, the inventive concepts are not limited as including one first buffer 122_1 and one second buffer 122_2, and any number of buffers may be included.

Figure 4:
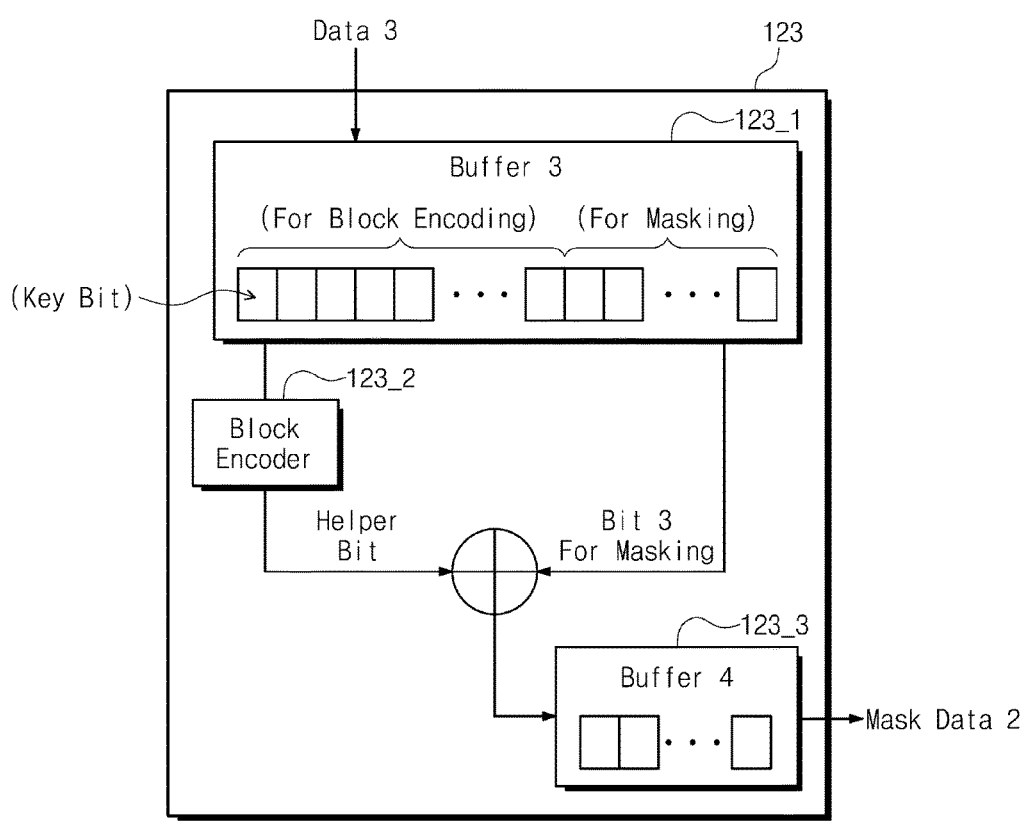
FIG. 4 illustrates a block diagram of a block encoding unit of FIG. 2 in detail.

FIG. 4 illustrates a block diagram of a block encoding unit of FIG. 2 in detail. FIG. 4 will be described with reference to FIG. 2. The block encoding unit 123 include a third buffer (Buffer 3) 123_1, a block encoder 123_2, and a fourth buffer (Buffer 4) 123_3.

The third buffer 123_1 receives and stores third bits (key bits) of the third data from the bit encoding unit 122. The third bits stored in the third buffer 123_1 may be updated by the bit encoding unit 122. The third buffer 123_1 may store the third bits in units of block encoding. The third buffer 123_1 may store the third bits in units of block encoding, instead of storing all the third bits configuring the third data.

The block encoder 123_2 encodes the third bits depending on a block error correction code (e.g., a BCH code) and generates helper bits. The helper bits may thus be encoded bits generated responsive to the third bits. The helper bits may configure helper data, and the helper data may be used to correct an error of the second data (valid data of the PUF data) described above. The helper data may be generated based on the second data (that is, based on the second bits of the second data that are the valid bits of the first data). In the case where the helper data are stored to the NVM 140 without modification, an attacker may infer or predict the PUF data by using the helper data stored in the NVM 140. To prevent inferring or predicting of the PUF data, the helper data may also be masked as in the first mask data.

For masking the helper bits, the third buffer 123_1 further receives and stores the third bits from the bit encoding unit 122. That is, referring to FIG. 4, the third buffer 123_1 may further store third bits for masking in addition to third bits corresponding to the unit of encoding of the block error correction operation. The block encoding unit 123 may perform a bitwise operation (e.g., an XOR operation) on the helper bits and the third bits for masking (Bit 3 For Masking) and may generate second mask bits. The second mask bits may configure the second mask data (Mask Data 2).

The fourth buffer 123_3 stores the second mask bits of the second mask data which are a result of the bitwise operation of the block encoding unit 123. The fourth buffer 123_3 may store the second mask bits for masking the helper bits (i.e., helper bits corresponding to the unit of the block error correction operation) generated by the block encoding, instead of storing all the second mask bits configuring the second mask data. When all the second mask bits of the second mask data are completely transmitted from the fourth buffer 123_3 to the NVM 140, the key enrollment process ends.

In an embodiment of the inventive concepts, the block encoding unit 123 may further include a buffer for storing an intermediate value, a final value, etc. generated by encoding third bits stored in the third buffer 123_1 or performing a bitwise operation on the third bits, in addition to the third and fourth buffers 123_1 and 123_3 illustrated in FIG. 4. Also, an embodiment is illustrated in FIG. 4 as the block encoding unit 123 includes one third buffer 123_1 and one fourth buffer 123_3. However, the inventive concepts are not limited as including one third buffer 123_1 and one fourth buffer 123_3, and any number of buffers may be included.

Figure 5:
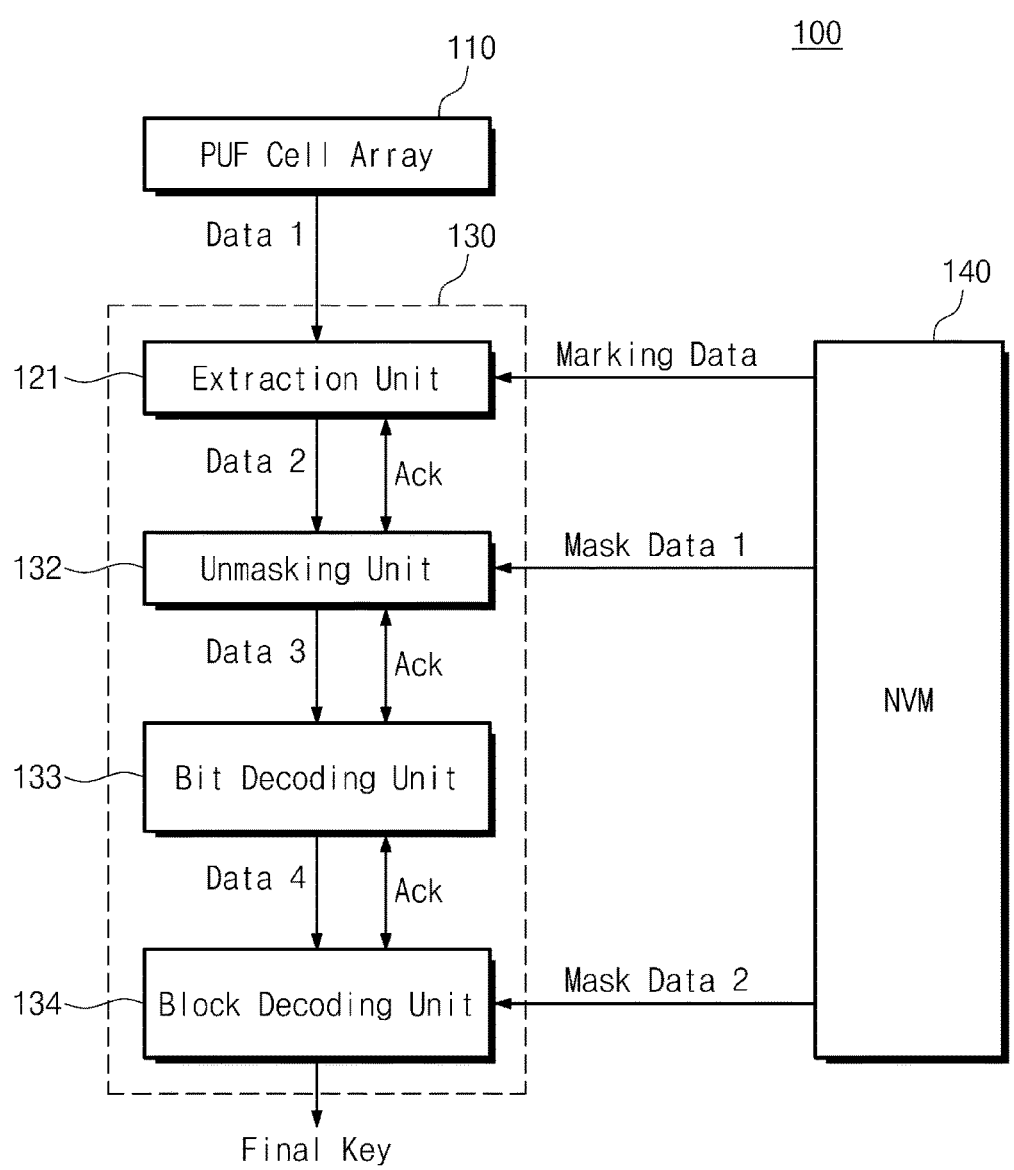
FIG. 5 illustrates a block diagram of a key generation unit of FIG. 1 in detail.

FIG. 5 illustrates a block diagram of a key generation unit of the semiconductor device 100 of FIG. 1 in detail. Prior to describing FIG. 5, the first to third data (i.e., Data 1, Data 2 and Data 3) illustrated in FIG. 2 are data generated in the key enrollment process, and first to fourth data illustrated in FIG. 5 are data generated in the key generation process. Accordingly, the first to third data illustrated in FIG. 2 are different from the first to fourth data illustrated in FIG. 5. Also, the for the purpose of simplification the key enrollment unit 120 of FIG. 1 is not shown in FIG. 5.

As in the transmission of first data to the key enrollment unit 120, the PUF cell array 110 as shown in FIG. 5 transmits first data (Data 1) to the key generation unit 130. The key generation unit 130 receives the first data from the PUF cell array 110 depending on a request of an application which the semiconductor device 100 uses (or based on a request of a user or an authentication request), and recovers a security key by using the marking data (Marking Data), the first mask data (Mask Data 1), and the second mask data (Mask Data 2) which the key enrollment unit 120 stores to the NVM 140.

The key generation unit 130 includes the extraction unit 121, an unmasking unit 132, a bit decoding unit 133, and a block decoding unit 134. The PUF cell array 110, the extraction unit 121, the unmasking unit 132, the bit decoding unit 133, and the block decoding unit 134 may be connected in series to enable a pipeline operation. As in the key enrollment unit 120, the key generation unit 130 may not wait until all the first bits configuring the first data are received from the PUF cell array 110 to begin processing. While receiving first bits from the PUF cell array 110 by unit of sub PUF cell array, the key generation unit 130 may process the received first bits.

The extraction unit 121 may be identical to the extraction unit 121 included in the key enrollment unit 120 of FIG. 1. The extraction unit 121 receives the first data (Data 1) from the PUF cell array 110 in the key generation process. As described above, due to a characteristic of the PUF cell array 110, the first data generated in the key enrollment process may be identical to or different from the first data generated in the key generation process.

The extraction unit 121 receives the first bits configuring the first data from the PUF cell array 110 and receives the marking bits configuring the marking data from the NVM 140. That is, the extraction unit 121 transmits the marking data to the NVM 140 in the key enrollment process, and receives the marking data from the NVM 140 in the key generation process.

The extraction unit 121 extracts second bits, which are valid, from among the first bits by using the marking bits. As described above, the marking bits may configure the valid map indicating whether the first bits are valid. Accordingly, the extraction unit 121 may determine whether to output a received first bit as a second bit, depending on a logical value ("0" or "1") of a marking bit. The extraction unit 121 extracts only valid bits of the first bits. The extraction unit 121 transmits the second bits configuring the second data to the unmasking unit 132.

The unmasking unit 132 receives the second bits configuring the second data (Data 2) from the extraction unit 121 of the key generation unit 130 and receives the first mask bits configuring the first mask data from the NVM 140. The unmasking unit 132 may unmask the second bits by using the first mask bits configuring the first mask data and may generate third bits which are unmasked, while receiving the second bits configuring the second data. Here, the third bits may configure third data (Data 3), and the second data may be converted to the third data for bit error correction through the unmasking operation. The unmasking unit 132 transmits the third bits configuring the third data to the bit decoding unit 133.

The bit decoding unit 133 decodes the third bits for a bit error correction operation while receiving the third bits configuring the third data from the unmasking unit 132. For example, the bit decoding unit 133 may perform a majority voting operation on the third bits, and may correct a bit error of the second bits. The bit decoding unit 133 compresses the third bits to fourth bits (key bits), and transmits the fourth bits to the block decoding unit 134. The fourth bits may configure fourth data (Data 4).

The block decoding unit 134 decodes the fourth bits while receiving the fourth bits configuring the fourth data from the bit decoding unit 133. The unit of decoding of the block decoding unit 134 may be a block, and the block decoding unit 134 may gather the fourth bits and may generate blocks. The block decoding unit 134 receives the second mask bits configuring the second mask data from the NVM 140 and unmasks the second mask bits to the above-described helper bits (i.e., the helper bits of the helper data of FIG. 4). The block decoding unit 134 may correct an error of the second bits depending on an error correction code. That is, the block decoding unit 134 may correct an error by decoding the fourth bits and the second mask bits, and may generate a final key (or a security key).

Figure 6:
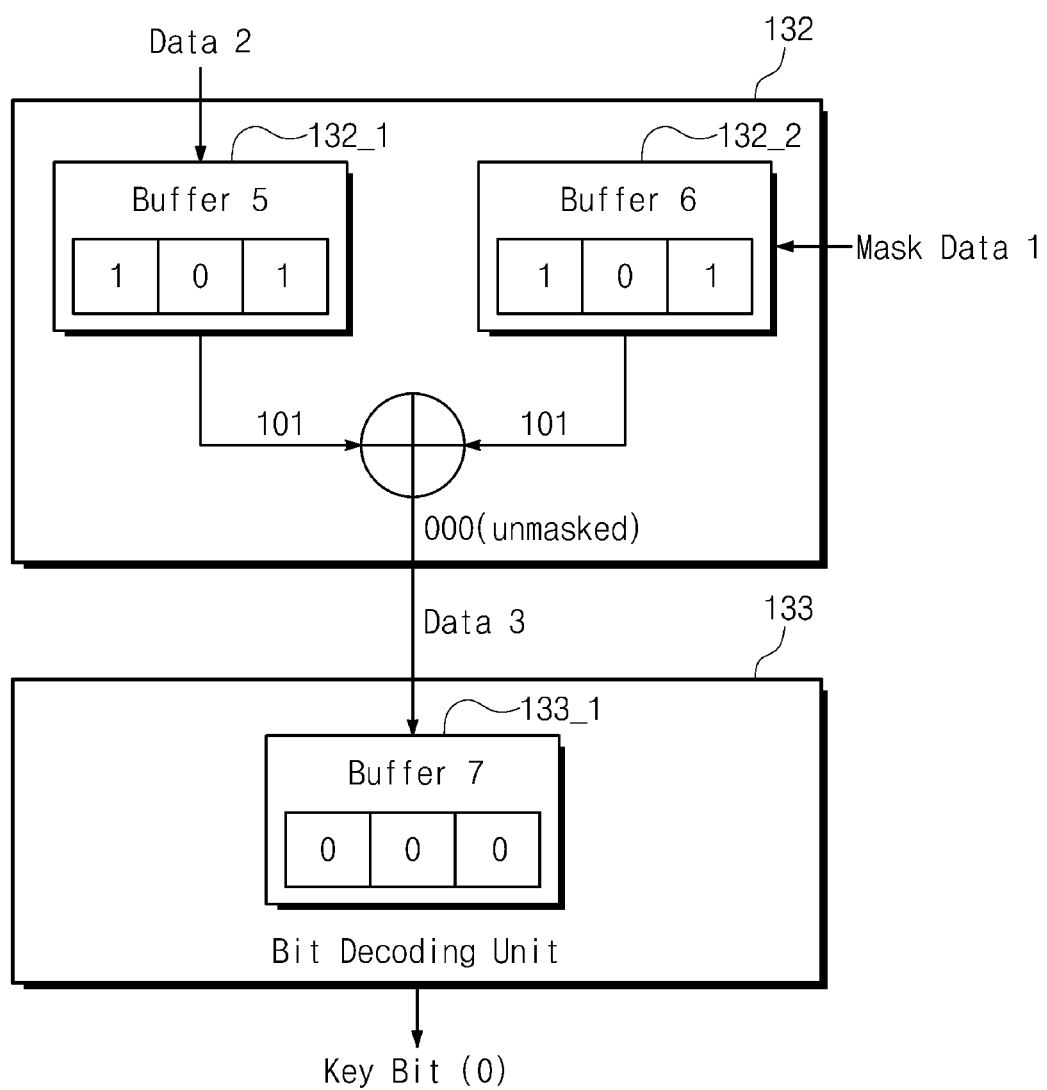
FIG. 6 illustrates a block diagram of an unmasking unit and a bit decoding unit of FIG. 5 in detail, where an error is absent from an output of the PUF cell array.
Figure 7:
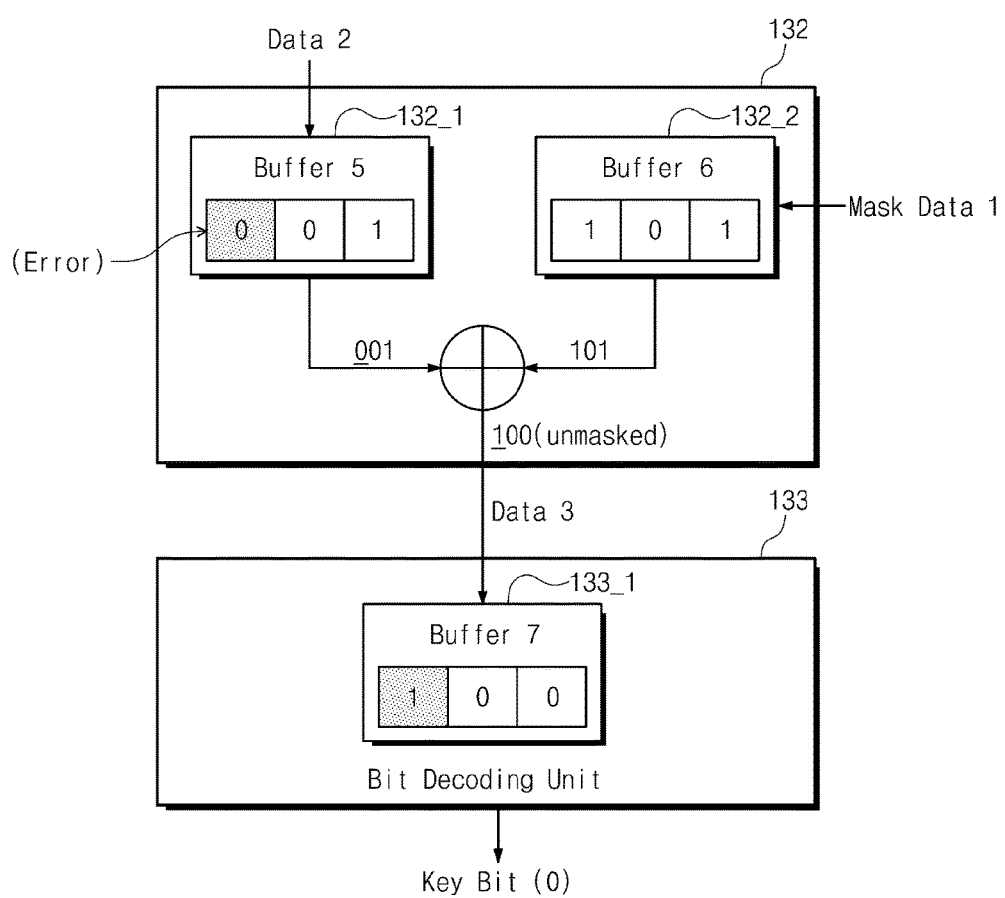
FIG. 7 illustrates a block diagram of an unmasking unit and a bit decoding unit of FIG. 5 in detail, where an error is present in an output of the PUF cell array.

FIG. 6 illustrates a block diagram of an unmasking unit and a bit decoding unit of FIG. 5 in detail, where an error is absent from an output of the PUF cell array. FIG. 7 illustrates a block diagram of an unmasking unit and a bit decoding unit of FIG. 5 in detail, where an error is present in an output of the PUF cell array. The unmasking unit 132 includes a fifth buffer (Buffer 5) 132_1 and a sixth buffer (Buffer 6) 132_2.

The fifth buffer 132_1 receives and stores the second bits of the second data from the extraction unit 121 of the key generation unit 130. The second bits stored in the fifth buffer 132_1 may be updated by the extraction unit 121. The number of bits to be stored in the fifth buffer 132_1 may be determined in units of bit decoding which may be identical to the units of bit error correction or the units of bit encoding. For example, in the case where the bit decoding unit 133 decodes third bits depending on the repetition code, the number of bits to be stored in the fifth buffer 132_1 may be an odd number of at least 3 or more.

An example is illustrated in FIGS. 6 and 7 where three bits are stored in the fifth buffer 132_1. However, the inventive concepts are not limited thereto, and in some embodiments the fifth buffer 132_1 may store the second bits in units of bit decoding of the bit decoding unit 133, instead of storing all the second bits configuring the second data.

In still further embodiments of the inventive concepts, unlike as shown in FIG. 6, the fifth buffer 132_1 may not store the second bits in units of bit decoding. The fifth buffer 132_1 may instead store at least one second bit. In this case, the second bit stored in the fifth buffer 132_1 may be provided for a bitwise operation, and then, a new second bit may be stored to the fifth buffer 132_1.

The sixth buffer 132_2 receives and stores the first mask bits configuring the first mask data from the NVM 140. The number of bits to be stored in the sixth buffer 132_2 may be determined depending on the unit of bit decoding, and may be identical to the number of bits to be stored in the fifth buffer 132_1. The sixth buffer 132_2 may store the first mask bits in units of bit decoding, instead of storing all the first mask bits configuring the first mask data.

In some embodiments of the inventive concepts, unlike as shown in FIG. 6, the sixth buffer 132_2 may not store the first mask bits in units of bit decoding. The sixth buffer 132_2 may instead store at least one first mask bit. In this case, a first mask bit stored in the sixth buffer 132_2 may be provided for a bitwise operation, and then, a new first mask bit may be stored to the sixth buffer 132_2.

The unmasking unit 132 receives the first mask bits configuring the first mask data from the NVM 140, and recovers any one bit removed in an encoding process depending on one of even parity and odd parity which the bit encoding unit 122 depends on. For example, in the embodiment described with respect to FIG. 6 it is assumed that the bit encoding unit 122 operates based on the even parity and the NVM 140 transmits the first mask bits of "01". As illustrated in FIG. 6, the unmasking unit 132 may recover the removed bit of "1" depending on the even parity, and "101" may be stored to the sixth buffer 132_2. Unlike the above-described exemplification, in other embodiments of the inventive concepts in which the bit encoding unit 122 operates based on the odd parity, the unmasking unit 132 may recover the removed bit depending on the odd parity.

The unmasking unit 132 performs a bitwise operation on the second bits stored in the fifth buffer 132_1 and the first mask bits stored in the sixth buffer 132_2, and generates third bits (Data 3). The second bits may be unmasked to the third bits through the bitwise operation of the unmasking unit 132. Here, the bitwise operation may be an XOR operation, an XNOR operation, or another logical operation.

The bit decoding unit 133 includes a seventh buffer (Buffer 7) 133_1. The seventh buffer 133_1 receives and stores the unmasked third bits of the third data from the unmasking unit 132. The number of third bits to be stored in the seventh buffer 133_1 may be determined depending on the unit of bit decoding, and may be identical to the number of bits to be stored in each of the fifth and sixth buffers 132_1 and 132_2. The seventh buffer 133_1 may store the third bits in units of bit decoding, instead of storing all the third bits configuring the third data. For example, the seventh buffer 133_1 may store the third bits in units of majority voting operation.

The bit decoding unit 133 may perform the majority voting operation on the third bits stored in the seventh buffer 133_1. For example, the bit decoding unit 133 may compress the third bits stored in the seventh buffer 133_1 to one key bit (a fourth bit).

The following Table 2 shows operation results of the unmasking unit 132 and the bit decoding unit 133 according to values of second bits stored in the fifth buffer 132_1.

TABLE 2

| Data 2 | Mask Data 1 | Recovered Mask Data 1 | Bitwise Operation | Key Bit |
|---|---|---|---|---|
| 000 | 00 | 000 | 000 | 0 |
| 001 | 10 | 110 | 111 | 1 |
| 010 | 01 | 101 | 111 | 1 |
| 011 | 11 | 011 | 000 | 0 |
| 100 | 11 | 011 | 111 | 1 |
| 101 | 01 | 101 | 000 | 0 |
| 110 | 10 | 110 | 000 | 0 |
| 111 | 00 | 000 | 111 | 1 |

In Table 2, the first mask bits are transmitted from the NVM 140 and may be identical to the first mask bits in Table 1. In Table 2, recovered first mask bits are stored to the sixth buffer 132_2. In Table 2, the recovered first mask bits may be generated by the unmasking unit 132 based on the even parity. When an error is absent from the second bits, bits obtained as a result of the bitwise operation may have the same logical value of "0" or "1". That is, the bit encoding unit 122 may generate the first mask bits in the key enrollment process so that bits generated as the result of the bitwise operation of the unmasking unit 132 (e.g., the bitwise operation shown as an XOR operation in FIG. 6) are identical to each other (e.g., 000). Below, an example in which a 2-bit error is corrected will be described in detail.

FIG. 6 illustrates the case where an error is absent from an output of the PUF cell array 110. The second bits which are output from the extraction unit 121 shown in FIG. 2 during the key enrollment process responsive to the first data output from the PUF cell array 110, may be identical to the second bits which are output from the extraction unit 121 shown in FIG. 5 during the key generation process responsive to the first data output from the PUF cell array 110. That is, like the case where "101" may be stored to the first buffer 122_1 in FIG. 3, "101" may be stored to the fifth buffer 132_1 of FIG. 6.

FIG. 7 illustrates the case where an error is present in the output of the PUF cell array 110. The second bits which are output from the extraction unit 121 shown in FIG. 2 during the key enrollment process responsive to the first data output from the PUF cell array 110, may be different from the second bits which are output from the extraction unit 121 shown in FIG. 5 during the key generation process responsive to the first data output from the PUF cell array 110. That is, unlike the case where "101" may be stored to the first buffer 122_1 shown in FIG. 3, second bits, one of which is flipped, for example "001", may be stored to the fifth buffer 132_1 of FIG. 7.

The first mask bits are transmitted from the NVM 140. Accordingly, the first mask bits of "101" may be identically stored to the sixth buffer 132_2 of FIG. 6 and the sixth buffer 132_2 of FIG. 7.

Referring to FIG. 6, the unmasking unit 132 performs an XOR operation on "101" and "101" and generates the third bits of "000". The bit decoding unit 133 checks the number of 0's and the number of 1's from the third bits "000". Since "0" bits are only stored in the seventh buffer 133_1 of FIG. 6, the bit decoding unit 133 outputs a key bit of "0".

Referring to FIG. 7, the unmasking unit 132 performs an XOR operation on "001" and "101" and generates the third bits of "100". The bit decoding unit 133 checks the number of 0's and the number of 1's from the third bits "100". Since one "1" bit and two "0" bits are stored in the seventh buffer 133_1 of FIG. 7, the bit decoding unit 133 outputs a key bit of "0". That is, the error of the second bits may be corrected by the majority voting operation. An example is illustrated in FIG. 7 where an MSB of the second bits stored in the fifth buffer 132_1 of FIG. 7 is erroneous. However, if the error is present in any bit other than the MSB, the error may be corrected by the majority voting operation.

In an embodiment of the inventive concepts, the unmasking unit 132 may further include a buffer for storing an intermediate value, a final value, etc. generated by unmasking second bits stored in the fifth buffer 132_1, recovering a removed first mask bit, or performing a bitwise operation on the second bits and the first mask bits, in addition to the fifth and sixth buffers 132_1 and 132_2 illustrated in FIGS. 6 and 7. Also, an embodiment of the inventive concepts is illustrated in FIGS. 6 and 7 as the unmasking unit 132 includes one fifth buffer 132_1 and one sixth buffer 132_2. However, the inventive concepts are not limited as including one fifth buffer 132_1 and one sixth buffer 132_3, and any number of buffers may be included.

In FIGS. 6 and 7, the bit decoding unit 133 may further include a buffer for storing an intermediate value, a final value, etc. generated by correcting a bit error, in addition to the seventh buffer 133_1. Also, an embodiment is illustrated in FIGS. 6 and 7 as the bit decoding unit 133 includes one seventh buffer 133_1. However, the inventive concepts are not limited as including one seventh buffer 133_1, and any number of buffers may be included.

Figure 8:
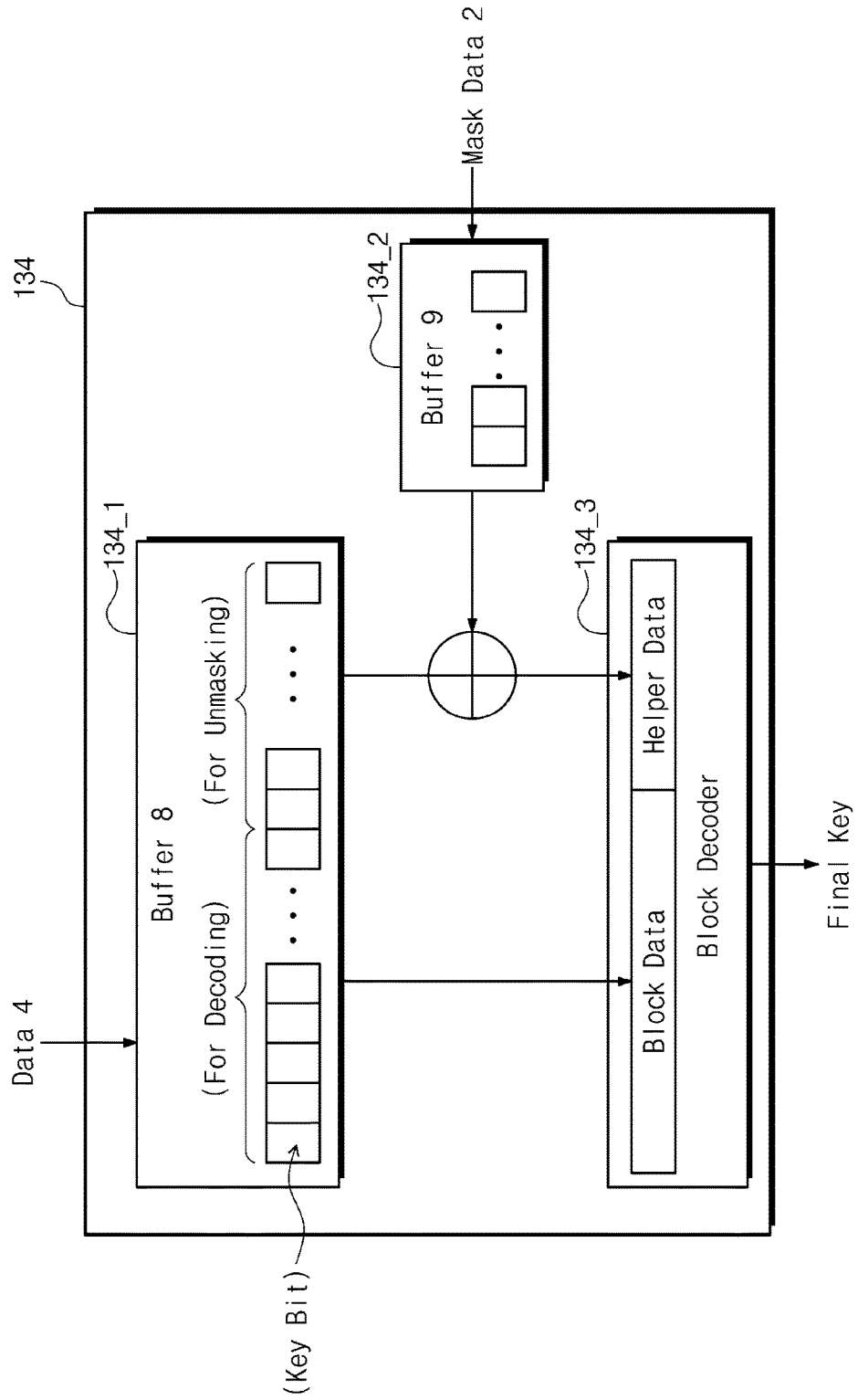
FIG. 8 illustrates a block diagram of a block decoding unit of FIG. 5 in detail.

FIG. 8 illustrates a block diagram of a block decoding unit of FIG. 5 in detail. FIG. 8 will be described with reference to FIGS. 5 to 7. The block decoding unit 134 includes an eighth buffer (Buffer 8) 134_1, a ninth buffer (Buffer 9) 134_2, and a block decoder 134_3.

The eighth buffer 134_1 receives and stores fourth bits (key bits) of the fourth data from the bit decoding unit 133. The fourth bits stored in the eighth buffer 134_1 may be updated by the bit decoding unit 133. The eighth buffer 134_1 may store bits in units of block decoding which may be the unit of block error correction or the unit of block encoding. The eighth buffer 134_1 may store the fourth bits in units of block decoding, instead of storing all the fourth bits configuring the fourth data. Also, the eighth buffer 134_1 further receives and stores fourth bits from the bit decoding unit 133 for unmasking the second mask bits configuring the second mask data, in addition to the fourth bits corresponding to the unit for block decoding.

The ninth buffer 134_2 receives and stores the second mask bits from the NVM 140. The ninth buffer 134_2 may store the second mask bits for unmasking helper data necessary for a block error correction operation, instead of storing all the second mask bits configuring the second mask data.

The block decoding unit 134 unmasks the second mask bits stored in the ninth buffer 134_2 by using the fourth bits for unmasking stored in the eighth buffer 134_1. The block decoding unit 134 performs a bitwise operation (e.g., an XOR operation) on the fourth bits for unmasking stored in the eighth buffer 134_1 and the second mask bits stored in the ninth buffer 134_2 and generates helper bits configuring the helper data.

The block decoder 134_3 decodes block data composed of the fourth bits and the helper data composed of the helper bits depending on an error correction code and corrects an error, and provides the result as the final key (i.e., the security key). The block error correction code may be a BCH code. The block decoder 134_3 does not decode all bits of the data at one time, so that the bit error of all such decoded bits may then be corrected. Instead, the block decoder 134_3 divides all the fourth bits into a plurality of blocks, and performs an error correction operation in units of block. Also, all the helper bits of the helper data may be divided. Referring to FIG. 8, the block decoder 134_3 decodes the fourth bits provided from the eighth buffer 134_1 in the units of block and the helper bits obtained as a result of the bitwise operation, and corrects an error in a block.

In an embodiment of the inventive concepts, the block decoding unit 134 may further include a buffer for storing an intermediate value, a final value, etc. generated by decoding fourth bits stored in the eighth buffer 134_1 or performing a bitwise operation on the fourth bits for unmasking and the second mask bits, in addition to the eighth and ninth buffers 134_1 and 134_2 illustrated in FIG. 8. Also, an embodiment is illustrated in FIG. 8 as the block decoding unit 134 includes one eighth buffer 134_1 and one ninth buffer 134_2. However, the inventive concepts are not limited as including one eight buffer 134_1 and one ninth buffer 134-2, and any number of buffers may be included.

In an embodiment, each of the above-described buffers 122_1, 122_2, 123_1, 123_2, 132_1, 132_2, 133_1, 134_1, and 134_2 may be implemented by using at least one of a latch, a register, and an SRAM. Also, each of the buffers 122_1, 122_2, 123_1, 123_2, 132_1, 132_2, 133_1, 134_1, and 134_2 may receive or transmit bits based on the clock and the acknowledgment signal Ack, which are previously described. For example, each of the buffers 122_1, 122_2, 123_1, 123_2, 132_1, 132_2, 133_1, 134_1, and 134_2 may be implemented by using a shift register which sequentially stores received bits.

FIG. 9 illustrates a diagram of how data are processed in a key generation unit of FIG. 1. FIG. 9 will be described with reference to FIGS. 5 to 8.

The extraction unit 121, the unmasking unit 132, the bit decoding unit 133, and the block decoding unit 134 are connected in series. Referring to FIG. 9, the extraction unit 121 transmits second bits (e.g., as in Data 2) to the unmasking unit 132. The unmasking unit 132 transmits unmasked third bits (e.g., as in Data 3) to the bit decoding unit 133. The bit decoding unit 133 gathers and decodes the third bits in units of bit decoding. The unit of bit decoding may be referred to as a "unit of decoding of a bit error correction code (e.g., a repetition code)". The bit decoding unit 133 transmits fourth bits (e.g., Data 4) to the block decoding unit 134. A fourth bit may be generated by compressing at least three third bits. The block decoding unit 134 gathers and decodes the fourth bits in units of block decoding. The unit of block decoding may be referred to as a "unit of decoding of a block error correction code (e.g., a BCH code)".

In an embodiment, the extraction unit 121, the unmasking unit 132, the bit decoding unit 133, and the block decoding unit 134 may operate based on a clock. The second bits, the third bits, and the fourth bits may be transmitted in synchronization with the clock. For example, the extraction unit 121 and the unmasking unit 132 may exchange acknowledgment signals with each other for transmitting and receiving the second bits based on the clock. The unmasking unit 132 and the bit decoding unit 133 may exchange acknowledgment signals with each other for transmitting and receiving the third bits based on the clock. The bit decoding unit 133 and the block decoding unit 134 may exchange acknowledgment signals with each other for transmitting and receiving the fourth bits based on the clock.

Referring to FIG. 9, bits may be sequentially transmitted toward the extraction unit 121, the unmasking unit 132, the bit decoding unit 133, and the block decoding unit 134, and each of the extraction unit 121, the unmasking unit 132, the bit decoding unit 133, and the block decoding unit 134 may process received bits while receiving bits. That is, the extraction unit 121, the unmasking unit 132, the bit decoding unit 133, and the block decoding unit 134 may operate at the same time (i.e., concurrently or simultaneously). While the PUF cell array 110 outputs the first bits, the extraction unit 121 may process the first bits first output from the PUF cell array 110. While the extraction unit 121 outputs the second bits, the unmasking unit 132 may process the second bits first output from the extraction unit 121. While the unmasking unit 132 outputs the third bits, the bit decoding unit 133 may process the third bits first output from the unmasking unit 132. While the bit decoding unit 133 outputs the fourth bits, the block decoding unit 134 may process the fourth bits first output from the bit decoding unit 133. Accordingly, a time taken to generate a key may be reduced.

Figure 10:
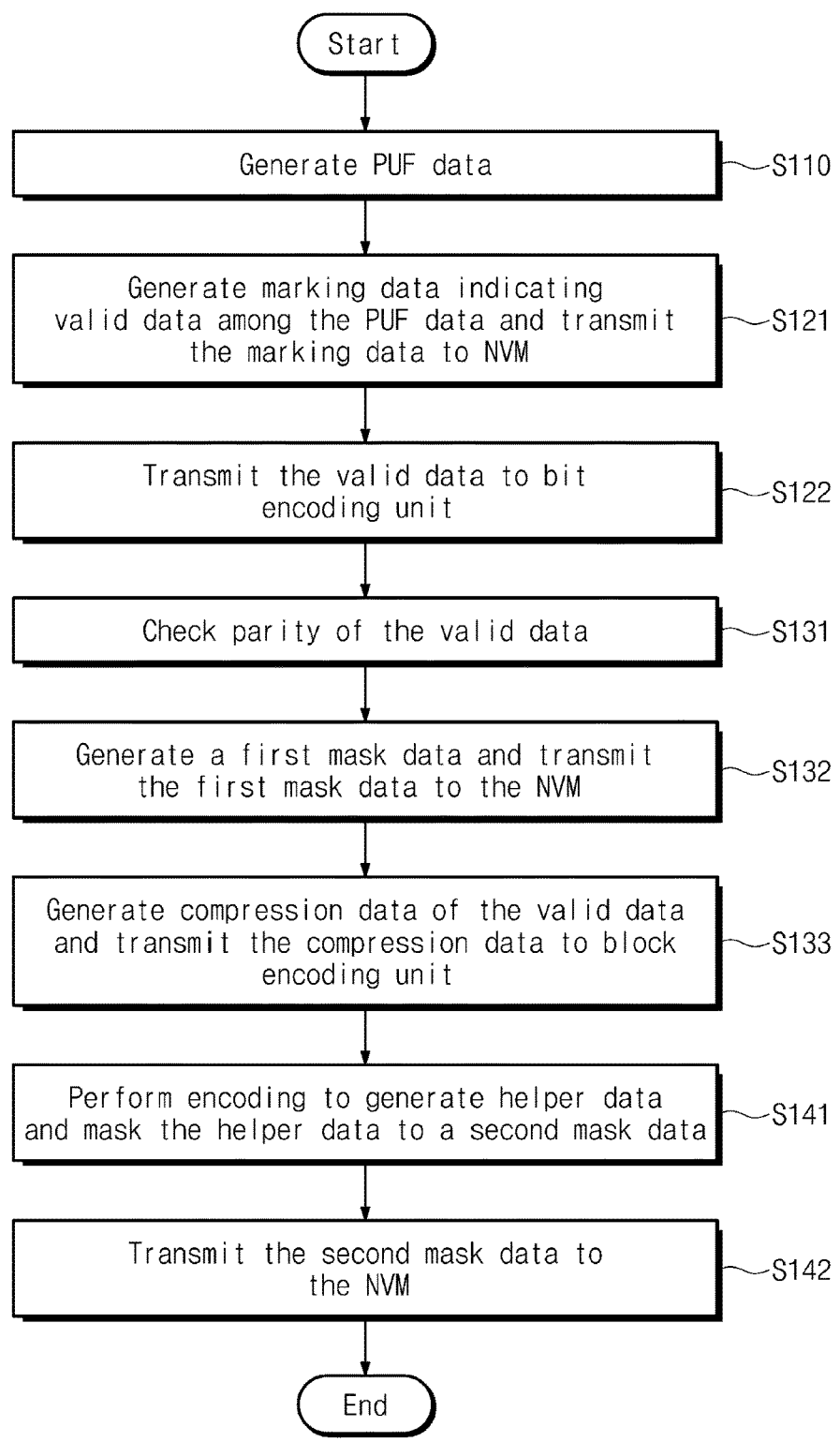
FIG. 10 illustrates a flowchart of a key enrollment process according to embodiments of the inventive concepts.

FIG. 10 illustrates a flowchart of a key enrollment process according to an embodiment of the inventive concepts. FIG. 10 will be described with reference to FIG. 2.

In operation S110, the PUF cell array 110 generates PUF data (first data). PUF bits of the PUF data may not be output at the same time. For example, the PUF bits may be repeatedly output in unit of 16 bits or 32 bits, which correspond to the size of a sub PUF cell array.

In operation S121, the extraction unit 121 generates marking data indicating valid data of the PUF data. The extraction unit 121 transmits the marking data to the NVM 140. In detail, the extraction unit 121 may transmit marking bits indicating second bits, which are valid, from among first bits to the NVM 140 while receiving first bits configuring the first data from the PUF cell array 110. In operation S121, the NVM 140 stores the marking data output from the extraction unit 121. In operation S122, the extraction unit 121 transmits valid data (second data) to the bit encoding unit 122. In an embodiment, operation S121 and operation S122 may be performed while the PUF data of operation S110 are transmitted.

In operation S131, the bit encoding unit 122 checks parity of the valid data. The bit encoding unit 122 generates a value to be used for a bitwise operation of the valid data depending on the parity of the valid data. In operation S132, the bit encoding unit 122 generates the first mask data depending on the parity of the valid data and transmits the first mask data to the NVM 140. In detail, while receiving the second bits from the extraction unit 121, the bit encoding unit 122 may generate the first mask bits by encoding the second bits depending on the parity of the second bits and may transmit the first mask bits to the NVM 140. In operation S132, the NVM 140 stores the first mark data output from the bit encoding unit 122.

In operation S133, the bit encoding unit 122 generates compression data (third data) of the valid data depending on the parity of the valid data (i.e., the parity of the second bits). The bit encoding unit 122 transmits the compression data to the block encoding unit 123. In an embodiment of the inventive concepts, operation S131, operation S132, and operation S133 may be performed while the PUF data of operation S110 are transmitted and while the valid data of operation S121 and operation S122 are transmitted.

In operation S141, the block encoding unit 123 encodes the compression data and generates the helper data. The block encoding unit 123 masks the helper data and provides the masked helper data as the second mask data. In detail, while receiving the third bits, which are the second bits compressed by the bit encoding unit 122, the block encoding unit 123 may generate the helper bits by encoding the third bits and may mask the helper bits by using the third bits for masking.

In operation S142, the block encoding unit 123 transmits the second mask data to the NVM 140. In operation S142, the NVM 140 stores the second mask data output from the block encoding unit 123. In an embodiment of the inventive concepts, operation S141 and operation S142 may be performed while the PUF data of operation S110 are transmitted, while the valid data of operation S121 and operation S122 are transmitted, and while the first mask data of operation S131 and operation S132 are transmitted.

Figure 11:
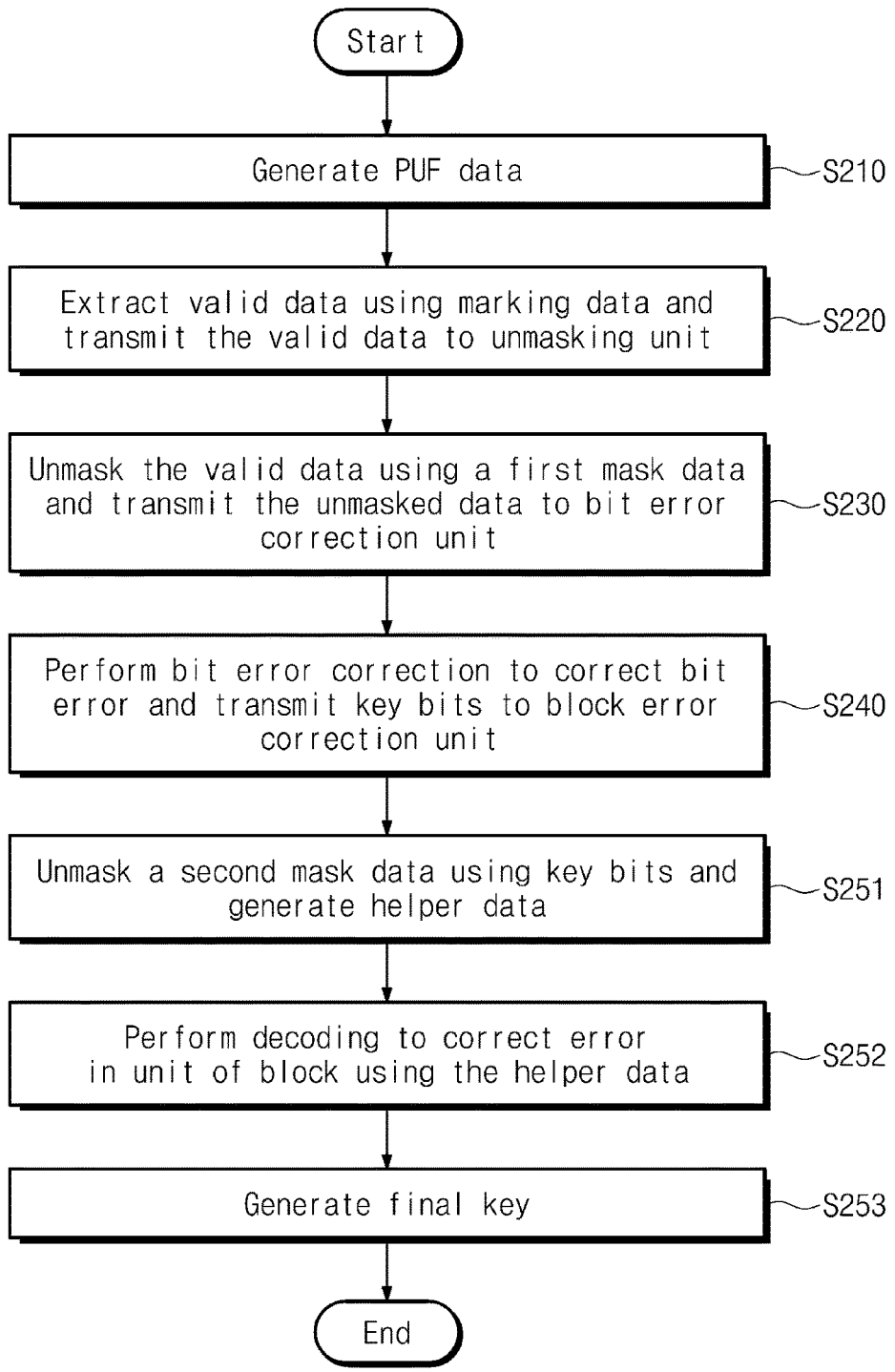
FIG. 11 illustrates a flowchart of a key generation process according to embodiments of the inventive concepts.

FIG. 11 illustrates a flowchart of a key generation process according to an embodiment of the inventive concepts. FIG. 11 will be described with reference to FIG. 5.

In operation S210, the PUF cell array 110 generates PUF data (first data). Operation S210 may be similar to operation S110. The PUF data generated in operation S210 may be identical to, or different from (in the case of including an error), the PUF data generated in operation S110.

In operation S220, the NVM 140 transmits the marking data stored in operation S121 to the extraction unit 121 shown in FIG. 5. In operation S220, the extraction unit 121 receives the marking data output from the NVM 140. The extraction unit 121 extracts valid data (second data) of the PUF data by using the marking data. The extraction unit 121 transmits the valid data to the unmasking unit 132. In detail, the extraction unit 121 may extract second bits, which are valid, from among the first bits while receiving the first bits configuring the first data from the PUF cell array 110 and receiving the marking bits configuring the marking data from the NVM 140. In an embodiment, operation S220 may be performed while the PUF data of operation S210 are transmitted.

In operation S230, the NVM 140 transmits the first mask data stored in operation S132 to the unmasking unit 132. The unmasking unit 132 receives the first mask data from the NVM 140. The unmasking unit 132 unmasks valid data by using the first mask data. The unmasking unit 132 transmits unmasked data (third data) to the bit decoding unit 133. In detail, the unmasking unit 132 may unmask the second bits by using the first mask bits while receiving the second bits from the extraction unit 121 and receiving the first masking bits configuring the first mask data from the NVM 140. In an embodiment, operation S230 may be performed while the PUF data of operation S210 are transmitted and while the valid data of operation S220 are transmitted.

In operation S240, the bit decoding unit 133 performs a bit error correction operation on the unmasked data. That is, the bit error correction operation is performed on the valid data. For example, the bit error correction operation may be the majority voting operation. The bit decoding unit 133 transmits key bits (fourth data), which are generated as a result of the majority voting operation, to the block decoding unit 134. In detail, the bit decoding unit 133 may compress the third bits to the fourth bits while receiving the third bits configuring the third data from the unmasking unit 132. In an embodiment, operation S240 may be performed while the PUF data of operation S210 are transmitted, while the valid data of operation S220 are transmitted, and while the unmasked data of operation S230 are transmitted.

In operation S251, the NVM 140 transmits the second mask data stored in operation S142 to the block decoding unit 134. The block decoding unit 134 receives the second mask data from the NVM 140. The block decoding unit 134 unmasks the second mask data by using the key bits and generates the helper data. In operation S252, the block decoding unit 134 decodes the key bits in units of block decoding using the helper data, and corrects an error in units of block decoding using a block error correction code. In operation S253, the block decoding unit 134 generates a final key (or a security key). In detail, the block decoding unit 134 may generate a key by decoding the fourth bits and the second mask bits while receiving the fourth bits from the bit decoding unit 133 and receiving the second mask bits from the NVM 140. In an embodiment of the inventive concepts, the third bits for masking as stored in the third buffer 123_1 in the block encoding unit 123 and the fourth bits for unmasking as stored in the eighth buffer 134_1 of the block decoding unit 134 correspond to output bits from a same set of PUF cells within the PUF cell array 110. In an embodiment, operation S251 to operation S253 may be performed while the PUF data of operation S210 are transmitted, while the valid data of operation S220 are transmitted, while the unmasked data of operation S230 are transmitted, and while the key bits of operation S240 are transmitted.

In the semiconductor device according to an embodiment of the inventive concept, operation S210 to operation S253 may be performed at the same time. Accordingly, even though the number of PUF cells, the size of PUF data, or the size of a security key increases, the sizes of the above-described buffers 122_1, 122_2, 122_3, 123_1, 123_2, 132_1, 132_2, 133_1, 134_1, and 134_2 may be uniformly maintained. Also, a time taken to generate a key by processing the PUF data may decrease.

Figure 12:
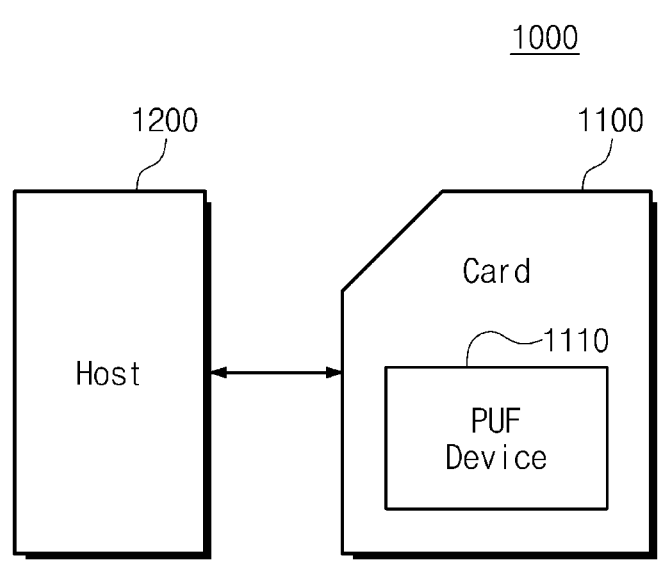
FIG. 12 illustrates a block diagram of an electronic system to which a semiconductor device according to embodiments of the inventive concepts is applied.

FIG. 12 illustrates a block diagram of an electronic system to which a semiconductor device according to embodiments of the inventive concepts is applied. The electronic system 1000 includes a smart card 1100 and a host 1200.

The smart card 1100 is a card including one or more integrated circuits. The smart card 1100 may be referred to as an "IC card" or a "chip card". For security, the smart card 1100 may include a PUF device 1110 according to embodiments of the inventive concepts. The PUF device 1110 may be the semiconductor device 100 described with reference to FIGS. 1 to 11. The smart card 1100 may perform an authentication procedure with the host 1200 by using a security key output from the PUF device 1110. Although not illustrated in FIG. 12, the smart card 1100 may further include a memory for storing data, a processor for processing data, and other various components.

In an embodiment, the PUF device 1110 may be packaged as various semiconductor packages. An integrated circuit may be mounted on the smart card 1100 using package technologies such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), or wafer-level processed stack package (WSP).

The host 1200 may perform the authentication procedure with the smart card 1100 by using the security key output from the PUF device 1110. After the authentication procedure is performed, the host 1200 may store data to the smart card 1100 or may read data from the smart card 1100. The host 1200 may be a computing device including one or more processors, a portable electronic device including an application processor (AP), or a server.

Figure 13:
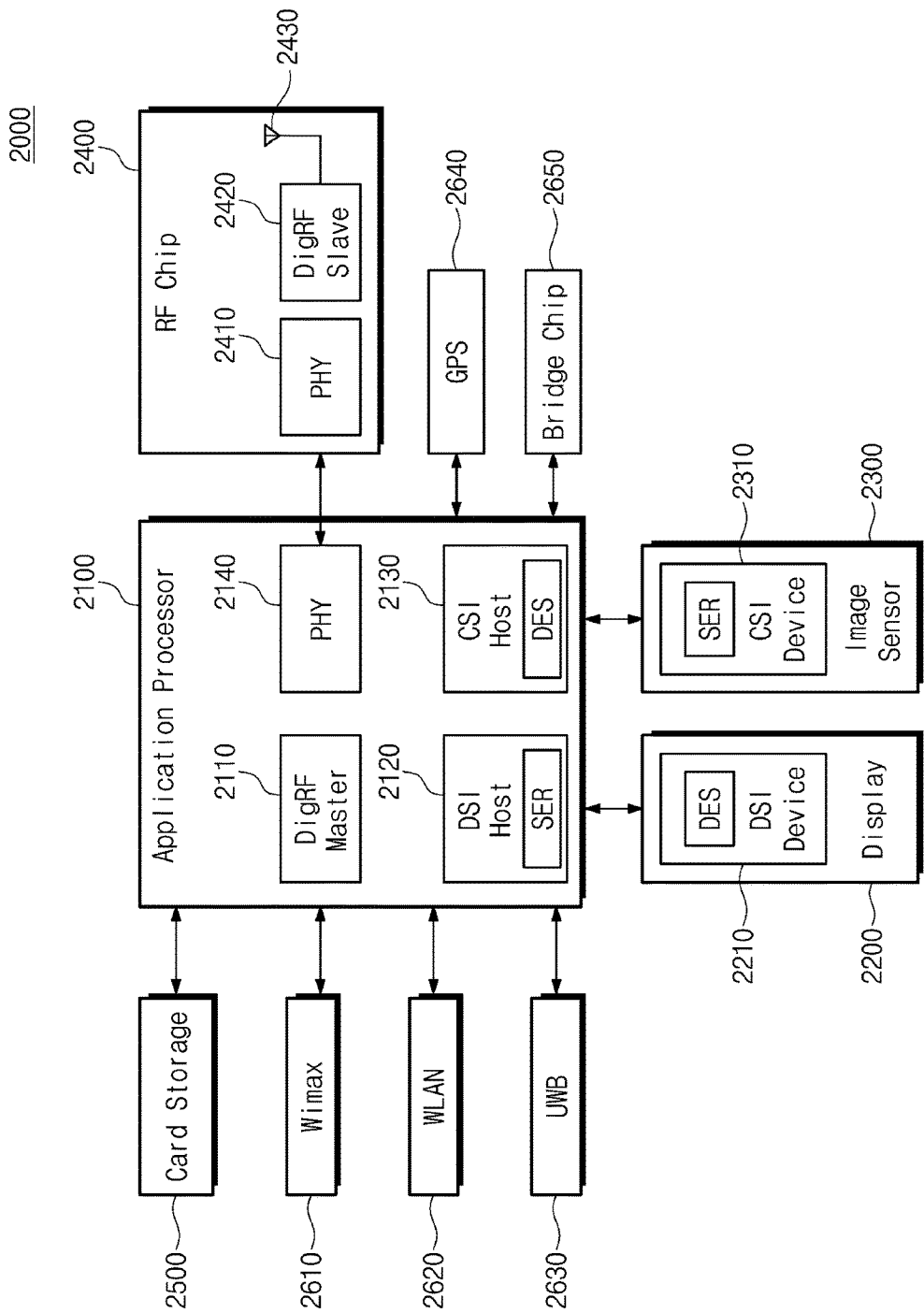
FIG. 13 illustrates a block diagram of an electronic device to which a smart card of FIG. 12 is applied.

FIG. 13 illustrates a block diagram of an electronic device to which a smart card of FIG. 12 is applied. The electronic device 2000 may be a data processing device which may for example use or support interfaces proposed by mobile industry processor interface (MIPI®) alliance, or other interface standards. The electronic device 2000 may for example be a portable communication terminal, a personal digital assistant (PDA), a portable multimedia player (PMP), a smartphone, or a wearable device, or any type of portable device.

The electronic device 2000 of the embodiment shown in FIG. 13 includes an application processor 2100, a display 2200, and an image sensor 2300. The application processor 2100 includes a DigRF$^{SM}$ master 2110, a display serial interface (DSI) host 2120, a camera serial interface (CSI) host 2130, and a physical layer (PHY) 2140.

The DSI host 2120 may communicate with a DSI device 2210 of the display 2200 through the DSI. For example, an optical serializer SER may be implemented in the DSI host 2120, and an optical deserializer DES may be implemented in the DSI device 2210.

The CSI host 2130 may communicate with a CSI device 2310 of the image sensor 2300 through the CSI. For example, an optical deserializer DES may be implemented in the CSI host 2130, and an optical serializer SER may be implemented in the CSI device 2310.

The electronic device 2000 may further include a radio frequency (RF) chip 2400 which communicates with the application processor 2100. The RF chip 2400 may include a physical layer 2410, a DigRF$^{SM}$ slave 2420, and an antenna 2430. For example, the physical layer 2410 of the RF chip 2400 and the physical layer 2140 of the application processor 2100 may exchange data with each other through a DigRF$^{SM}$ interface supported by the MIPI® alliance.

The electronic device 2000 may further include card storage 2500. The card storage 2500 may be the smart card 1100 of FIG. 12. After an authentication procedure is performed, the smart card 1100 may exchange data with the application processor 2100 in a state where the security is maintained.

The electronic device 2000 may communicate with an external system through worldwide interoperability for microwave access (WiMAX) 2610, a wireless local area network (WLAN) 2620, ultra wide band (UWB) 2630, among other wireless distribution methods. The electronic device 2000 may further include a global positioning system (GPS) device 2640 for processing position information. The electronic device 2000 may further include a bridge chip 2650 for managing connection with peripheral devices.

Figure 14:
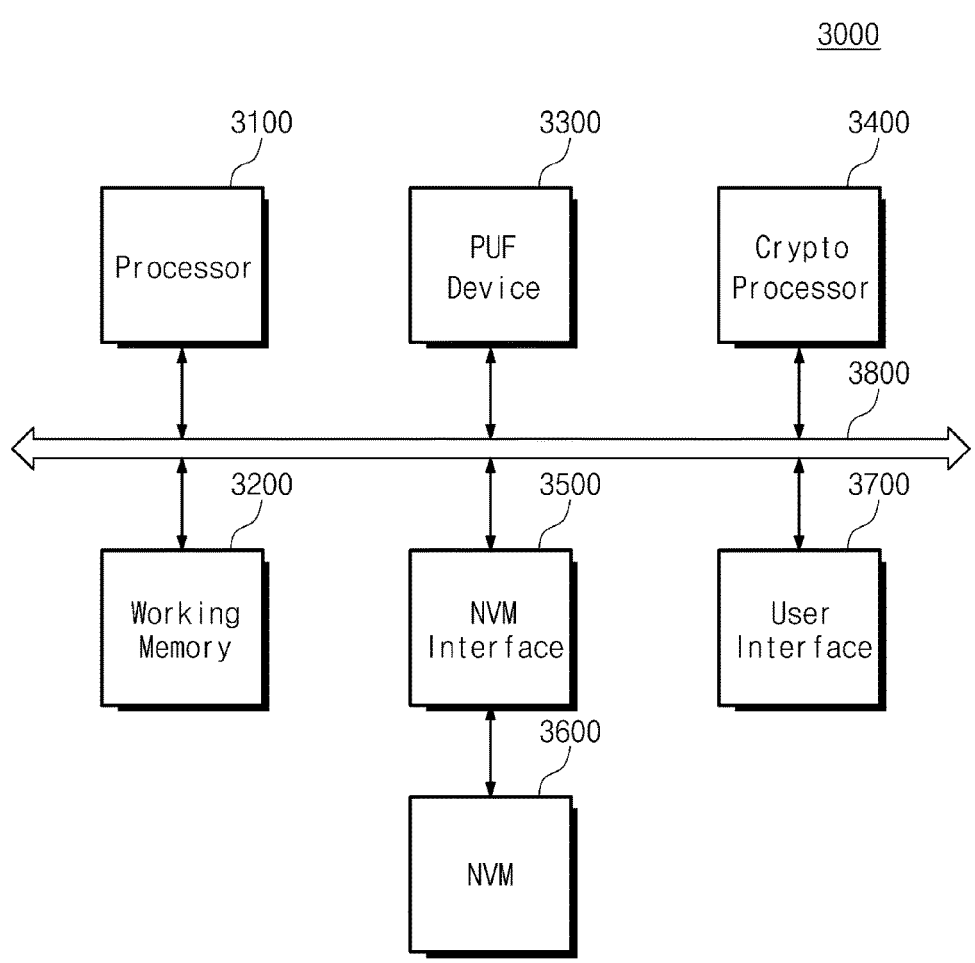
FIG. 14 illustrates a block diagram of a computing device to which a semiconductor device according to embodiments of the inventive concepts is applied.

FIG. 14 illustrates a block diagram of a computing device to which a semiconductor device according to embodiments of the inventive concepts is applied. The computing device 3000 includes a processor 3100, a working memory 3200, a PUF device 3300, a crypto processor 3400, an NVM interface 3500, an NVM 3600, and a user interface 3700, all interconnected by the bus 3800.

The processor 3100 may control overall operations of the computing device 3000. The processor 3100 which is a central processing unit may perform various kinds of operations. For example, the processor 3100 may include one or more processor cores.

The working memory 3200 may exchange data with the processor 3100. The working memory 3200 may temporarily store data which are used for an operation of the computing device 3000. For example, the working memory 3200 may include for example a high-speed memory such as a DRAM or an SRAM.

The PUF device 3300 may be the semiconductor device 100 described with reference to FIGS. 1 to 11. The PUF device 3300 may generate a key necessary for security. The PUF device 3300 may be implemented with hardware, software, or firmware. The crypto processor 3400 may perform encryption and decryption operations by using a key output from the PUF device 3300.

The NVM interface 3500 may exchange data with the NVM 3600 under control of the processor 3100, the PUF device 3300, or the crypto processor 3400. The NVM 3600 may store data which need to be retained regardless of power supply. In an embodiment, the marking data, the first mask data, and the second mask data described with reference to FIG. 1 may be stored to the NVM 3600, and the PUF device 3300 may not include an NVM therein.

The user interface 3700 may perform communication mediation between a user and the computing device 3000 under control of the processor 3100. In an embodiment, the user interface 3700 may include input interfaces such as for example a keyboard, a keypad, a button, a touch panel, a touch screen, a touch pad, a touch ball, a camera, a microphone, a gyroscope sensor, and a vibration sensor, among various other possible input interfaces. Furthermore, the user interface 3700 may include an output interface such as for example a liquid crystal display (LCD) device, a light emitting diode (LED) display device, an organic LED (OLED) display device, an active matrix OLED (AMOLED) display device, a speaker, a motor, or the like.

The bus 3800 may provide a communication path between the components of the computing device 3000. The components of the computing device 3000 may exchange data with each other in compliance with a bus format. In an embodiment, the bus format may include for example a universal serial bus (USB) format, a small computer system interface (SCSI) format, a peripheral component interconnect express (PCIe) bus format, an advanced technology attachment (ATA) bus format, a parallel ATA (PATA) bus format, a serial ATA (SATA) bus format, a serial attached SCSI (SAS) bus format, and an integrated drive electronics (IDE) bus format or the like.

The semiconductor device 100 is described as including units. The various described units or blocks may be implemented with hardware, software, or firmware, or a combination of any of hardware, software, and firmware. For example, in some embodiments the key enrollment unit 120 including the extraction unit 121, the bit encoding unit 122 and the block encoding unit 123, and the key generation unit 130 including the extraction unit 121, the unmasking unit 132, the bit decoding unit 133 and the block decoding unit 134 may be hardware such as logic gates, integrated circuits, passive and active electronic components and/or hardwired circuits. The units may be circuits. The hardware may optionally be driven by firmware and/or software. In other embodiments the key enrollment unit 120 and the key generation unit 130 may be implemented by one or more programmed microprocessors. In still further embodiments, the key enrollment unit 120 and the key generation unit 130 may be implemented by a combination of dedicated hardware to perform some functions, and one or more processors to perform other functions.

In a semiconductor device according to embodiments of the inventive concepts, PUF data may be processed by using a pipeline operation. Accordingly, even though the number of PUF cells, the size of PUF data, or the size of a security key increases, the size of a buffer which stores data generated during processing while a key is generated from the PUF data may be uniformly maintained. Also, a time taken to generate a key by processing the PUF data may decrease.

While the inventive concepts have been described with reference to exemplary embodiments thereof, it will be apparent to those of ordinary skill in the art that various changes and modifications may be made thereto without departing from the spirit and scope of the inventive concepts as set forth in the following claims.

What is claimed is:

1. A semiconductor device comprising:
a physically unclonable function (PUF) cell array including PUF cells outputting first bits;
a non-volatile memory configured to store marking bits indicative of whether the first bits are valid, first mask bits generated by masking second bits depending on a parity of the second bits, and second mask bits generated by masking helper bits associated with the second bits, wherein the second bits are valid bits from among the first bits;
an extracting unit configured to extract the second bits from the first bits by using the marking bits;
an unmasking unit configured to unmask the second bits by using the first mask bits while receiving the second bits to provide third bits;
a bit decoding unit configured to compress the third bits to provide fourth bits while receiving the third bits; and
a block decoding unit configured to generate a security key by decoding the fourth bits and the second mask bits,
wherein the extracting unit, the unmasking unit, the bit decoding unit, and the block decoding unit are connected in series and operate concurrently.

2. The semiconductor device of claim 1, wherein the unmasking unit is configured to perform a bitwise operation on the second bits and the first mask bits to provide the third bits.

3. The semiconductor device of claim 2, wherein the unmasking unit comprises:
a first buffer configured to store at least one bit of the second bits; and
a second buffer configured to store at least one bit of the first mask bits, and
wherein the unmasking unit is further configured to perform the bitwise operation on bits stored in the first and second buffers.

4. The semiconductor device of claim 2, wherein the bitwise operation is an exclusive OR (XOR) operation.

5. The semiconductor device of claim 1, wherein the bit decoding unit is further configured to correct an error of the second bits by performing a majority voting operation on the third bits, and
wherein the block decoding unit is further configured to correct an error of the second bits by decoding the fourth bits and the second mask bits depending on a block error correction code.

6. The semiconductor device of claim 5, wherein the bit decoding unit comprises a buffer configured to store bits, a number of which corresponds to a unit of decoding of the majority voting operation, from among the third bits, and
wherein the bit decoding unit is further configured to perform the majority voting operation on the bits stored in the buffer.

7. The semiconductor device of claim 5, wherein the block decoding unit comprises a buffer configured to store bits, a number of which corresponds to a unit of decoding of the block error correction code, from among the fourth bits, and
wherein the block decoding unit is further configured to decode the bits stored in the buffer.

8. The semiconductor device of claim 7, wherein the block decoding unit is further configured to generate the helper bits by performing a bitwise operation on the second mask bits and bits from among the fourth bits which correspond to the second mask bits, and correct the error of the second bits using the helper bits.

9. The semiconductor device of claim 5, wherein the block error correction code comprises a Bose-Chaudhuri-Hocquenghem (BCH) code.

10. The semiconductor device of claim 1, wherein the extracting unit is configured to transmit the second bits to the unmasking unit, and the unmasking unit is configured to transmit the third bits to the bit decoding unit, in synchronization with a clock.

11. A security key generation method of a semiconductor device comprising a PUF cell array, an extraction unit, an unmasking unit, a bit decoding unit, and a block decoding unit connected in series, the method comprising:
extracting, by the extraction unit, second bits from among first bits while receiving the first bits from the PUF cell array and receiving marking bits indicative of whether the first bits are valid from a non-volatile memory, wherein the second bits are valid bits from among the first bits;
unmasking, by the unmasking unit, the second bits to provide unmasked third bits by using first mask bits while receiving the second bits from the extraction unit and receiving the first mask bits from the non-volatile memory;
compressing, by the bit decoding unit, the unmasked third bits to provide fourth bits while receiving the unmasked third bits from the unmasking unit; and
generating, by the block decoding unit, a security key by decoding the fourth bits and second mask bits while receiving the fourth bits from the bit decoding unit and the second mask bits from the non-volatile memory.

12. The method of claim 11, wherein the extracting of the second bits comprises determining whether the first bits are valid depending on logical values of the marking bits.

13. The method of claim 11, wherein the unmasking of the second bits comprises performing a bitwise operation on the second bits and the first mask bits.

14. The method of claim 11, wherein the compressing of the unmasked third bits comprises performing a majority voting operation on the unmasked third bits.

15. The method of claim 11, wherein the generating of the security key comprises:
generating helper bits by performing a bitwise operation on the second mask bits and bits from among the fourth bits which correspond to the second mask bits; and
decoding the fourth bits by using the helper bits depending on a block error correction code.

16. A security key enrollment method of a semiconductor device comprising a PUF cell array, an extraction unit, a bit encoding unit, and a block encoding unit connected in series, the method comprising:
transmitting, by the extraction unit, marking bits indicative of second bits from among first bits to a non-volatile memory while receiving the first bits from the PUF cell array, wherein the second bits are valid bits from among the first bits;
generating, by the bit encoding unit, first mask bits by encoding the second bits depending on a parity of the second bits while receiving the second bits from the extraction unit, and transmitting the first mask bits to the non-volatile memory;
generating, by the bit encoding unit, third bits by compressing the second bits; and
generating, by the block encoding unit, helper bits by encoding the third bits, generating second mask bits by masking the helper bits by using the third bits, and transmitting the second mask bits to the non-volatile memory, while receiving the third bits from the bit encoding unit.

17. The method of claim 16, wherein the transmitting of the first mask bits to the non-volatile memory comprises performing a bitwise operation on the second bits depending on the parity of the second bits.

18. The method of claim 17, wherein the generating of the third bits comprises compressing the second bits depending on the parity of the second bits.

19. The method of claim 16, wherein the generating the helper bits comprises generating the helper bits by decoding the third bits depending on a block error correction code.

20. The method of claim 19, wherein the transmitting of the second mask bits to the non-volatile memory further comprises masking the helper bits by performing a bitwise operation on the helper bits and the third bits.

* * * * *